(12) United States Patent
Fields et al.

(10) Patent No.: US 8,082,272 B2
(45) Date of Patent: Dec. 20, 2011

(54) METHOD, SYSTEM, AND COMPUTER PROGRAM PRODUCT FOR MANAGING INFORMATION IN A COMPUTER NETWORK

(75) Inventors: Duane Kimbell Fields, Bastrop, TX (US); Valeria Maria Gomez De La Torre, Austin, TX (US); Eric Arthur Newman, Austin, TX (US); David Edward Panos, Austin, TX (US); Adam David Weinroth, Austin, TX (US)

(73) Assignee: Demand Media, Inc., Santa Monica, CA (US)

( * ) Notice: Subject to any disclaimer, the term of this patent is extended or adjusted under 35 U.S.C. 154(b) by 285 days.

(21) Appl. No.: 12/278,965

(22) PCT Filed: Feb. 9, 2007

(86) PCT No.: PCT/US2007/003629
§ 371 (c)(1),
(2), (4) Date: Aug. 8, 2008

(87) PCT Pub. No.: WO2007/095146
PCT Pub. Date: Aug. 23, 2007

(65) Prior Publication Data
US 2009/0313224 A1 Dec. 17, 2009

Related U.S. Application Data

(60) Provisional application No. 60/772,359, filed on Feb. 10, 2006.

(51) Int. Cl.
*G06F 17/30* (2006.01)
(52) U.S. Cl. .............. 707/781; 707/783; 725/46
(58) Field of Classification Search ............. 707/781, 707/783, 770, 999.003; 725/35, 46, 135; 705/51, 54
See application file for complete search history.

(56) References Cited

U.S. PATENT DOCUMENTS

| | | | |
|---|---|---|---|
| 6,912,512 B2* | 6/2005 | Miyazaki et al. | 705/51 |
| 7,353,541 B1* | 4/2008 | Ishibashi et al. | 726/26 |
| 2003/0018582 A1 | 1/2003 | Yaacovi | |
| 2005/0289147 A1 | 12/2005 | Kahn et al. | |
| 2006/0015904 A1 | 1/2006 | Marcus | |
| 2007/0011704 A1* | 1/2007 | Anglin, Jr. | 725/46 |

OTHER PUBLICATIONS

Written Opinion and International Search Report for International Application No. PCT/US2007/003629, Feb. 5, 2008.

\* cited by examiner

*Primary Examiner* — Monica Pyo
(74) *Attorney, Agent, or Firm* — Greenberg Traurig, LLP

(57) ABSTRACT

A server receives and stores a contributor's content for redistribution of the content via a distributor's web site. From the distributor, the server receives and stores a specification relating to the content and the manner in which a portion of the content is to be displayed. In accordance with the specification, the server outputs the portion of the content to the distributor.

46 Claims, 47 Drawing Sheets

*FIG. 3B*

BlogBurst

| Home | Bloggers | Publishers | News |

Not logged in.

Setup

At this time BlogBurst requires an invitation code in order to create an account. If you have a high quality, topic-focused blog that you'd like for us to review please let us know here. If we like your blog, we'll send you an invitation code.

If you were invited to the BlogBurst network and already have an invitation code, please enter your code and basic user information below.

| Field | Value |
|---|---|
| Invitation Code | B8JghRp2d5IUE8gMxQ |
| Email address | new_contributor@email. |

This will be your user name and your contact email for PSN. Please make sure this email address is current and valid.

| Field | Value |
|---|---|
| Confirm email address | new_contributor@email. |
| Password | ••••• |
| Confirm Password | ••••• |
| First Name | Jane |
| Last Name | Doe |
| Zip Code | 78701 |

XXXXX or XXXXX-XXXX

| Field | Value |
|---|---|
| Date of Birth | 11/07/1973 | mm/dd/yyyy

| Field | Value |
|---|---|
| Name of Organization | MyContent, Inc. |

By clicking the button below you agree to the Terms of Service.

[ I accept the Terms of Service ]

Build 11693

BlogBurst Home | Privacy | Terms | Contact Us | Copyright ©2005 Pluck

```
BlogBurst: Add a Blog - Mozilla Firefox                          _ □ ×
File  Edit  View  Go  Bookmarks  Tools  Help
◁▾ ▷▾ ⟳ ⊗ ⌂  [ http://psnstage.dc.pluck.com/Workbench/  ▾ ] ▶ Go
```

BlogBurst

| My Blogs | Search | Reports | My Account | Help |

Summary | Add a Blog

Jane Doe  |  Logout

Add a Blog

Select A Feed
Fields marked with * are required.

* Blog Url   http://myblog.blogger.com
* Blog Title  [          ]
* Feed Url(s) [          ]  [ Get ]
* Byline     [          ]
max length 60 characters
* Blog Summary [          ]

Build 11693

BlogBurst Home | Privacy | Terms | Contact Us | Copyright ©2005 Pluck

Done

*FIG. 3M*

```
BlogBurst: Add a Blog - Mozilla Firefox                           _ □ x
File  Edit  View  Go  Bookmarks  Tools  Help
◁ ▽  ▷ ▽  ⟲  ⊗  ⌂    http://psnstage.dc.pluck.com/Workbench/  ▽  ⊙ Go
```

BlogBurst

| My Blogs | Search | Reports | My Account | Help |

Summary | Add a Blog

Jane Doe | Logout

Add a Blog

Select A Feed

Fields marked with * are required.

**\* Blog Url**  http://myblog.blogger.com

**\*Blog Title**  [ Title of my blog ]

**\* Feed Url(s)**  [ http://myblog.blogger.com/atom.xml ▽ ]

**\* Byline**  [ Jane Doe ]
  max length 60 characters

**\* Blog Summary**  [ My blog is about... ]

- Home Media Option (HMO) for DirectTV Receivers with TiVo Petition Thursday, June 30, 2005

If you are a DirecTV subscriber, I urge you to sign the this petition which requests them to add Tivo's networking and multimedia features to DirecTV. The Tivo fully supports the ability to listen to music, view your photos, and much more throu...

- Smoked Brisket Monday, December 20, 2004

This is my recipe for smoked brisket. I usually buy the "flat" or "center cut" brisket, a rectangular piece of meat about 3-4 lbs. from the center of the brisket. It's the best part, and big enough for several meals for 2...

- Mexican Martini Sunday, May 16, 2004

This is a local Austin favorite served in many area restaurants. Everyone has a different recipe, but this one is the closest I've found. A top quality ($$$) tequila is critical to the recipe. I suggest Don Eduardo or Patron. Ingredients ...

[ Next (Claim Blog) ]

Build 11693

BlogBurst Home | Privacy | Terms | Contact Us | Copyright ©2005 Pluck

Done

*FIG. 3R*

BlogBurst

My Blogs | Search | Reports | My Account | Help

Summary | Add a Blog

Jane Doe | Logout

Edit Blog

Fields marked with * are required.

**\* Blog Title** [Autoblog]
max length 100 characters

**\* Blog Url** [http://www.autoblog.com/]

**\* Feed Url** [http://www.autoblog.com/jss.xml]

**\* Byline** [Autoblog Get your auto]
max length 60 characters

**\* Blog Summary** [News and reviews about cars, trucks, and more]

Blog Image [ ] [Browse...]

**\* Topics**  ☑ News & Opinion   ☑ Technology
select up to 3  ☐ Sports   ☐ Travel
☐ Gossip   ☐ Family
☐ Humor/Satire   ☐ Entertainment
☑ Business   ☐ Lifestyle

Localized Content [Chicago ▼]

**\* Tags/Keywords** [Auto]  [Cars]
Publishers will find your blogs using [Blog]  [ ]
these keywords  [ ]  [ ]

Other Comments [Funny commentary on the state of technology and
(writing style, tone, topical comments)  the auto industry]

[Save]

Done

*FIG. 3T*

BlogBurst

| My Blogs | Search | Reports | My Account | Help |

My Profile | Change Password

Jane Doe | Logout

Edit My Profile

First Name: Jane
Last Name: Doe
Profile Image: [ ] [Browse...]
Photo must be in jpg/png/gif format. Images larger than 75x75 pixels will be resized.
About Me: I have been blogging for 3 years.

Zip Code: 12345
XXXXX or XXXXX-XXXX
Date of Birth: 1/1/1901
mm/dd/yyyy
Gener: ○ Male  ⦿ Female

[Save]

Build 10168

BlogBurst Home | Privacy | Terms | Contact Us | Copyright ©2005 Pluck

*FIG. 3U*

BlogBurst: Request a Blog Review - Mozilla Firefox

File  Edit  View  Go  Bookmarks  Tools  Help http://psnstage.dc.pluck.com/Public/Blogg  Go

BlogBurst

[ Home ][ Bloggers ][ Publishers ][ News ]

Not logged in.

Request a Blog Review

* Email Address [new_contributor@email.]

* Blog Url [http://myblog.blogger.co]

* Topics select up to 3
- ☐ News & Opinion
- ☐ Sports
- ☐ Gossip
- ☐ Humor/Satire
- ☐ Business
- ☐ Technology
- ☐ Travel
- ☐ Family
- ☑ Entertainment
- ☐ Lifestyle

Comments [I have been blogging for the past 3 years. I average at least 1 post a day!]

[ Submit Request ]

Build 11693

BlogBurst Home | Privacy | Terms | Contact Us | Copyright ©2005 Pluck

Done

FIG. 4A

```
BlogBurst: Setup - Mozilla Firefox
File  Edit  View  Go  Bookmarks  Tools  Help
◁ ▽ ◁ ▽ ⊘ ⊗ ⌂  http://psnstage.dc.pluck.com/Public/Blogg ▽  ⊙Go
```

BlogBurst

| Home | Bloggers | Publishers | News |

Not logged in.

Setup

Email address [new_distributor@email.]
This will be your user name and your contact email for PSN.
Please make sure this email address is current and valid.

Confirm email address [new_distributor@email.]

Password [•••••]

Confirm Password [•••••]

First Name [Joseph]

Last Name [Publisher]

Zip Code [10012]
XXXXX or XXXXX-XXXX

Date of Birth [01/26/1968]
mm/dd/yyyy

Name of Organization [Online Newspaper, Inc.]

By clicking the button below you agree to the Terms of Service.

[ I accept the Terms of Service ]

Build 11693

BlogBurst Home | Privacy | Terms | Contact Us | Copyright ©2005 Pluck

Done

*FIG. 4F*

BlogBurst

My Library | Search | Reports | My Account | Help

My Folders | Output Channels | What's New

Joseph Publisher | Logout

Output Channel Detail

Channel Detail

Travel Section - Destinat [rename]    Channel ID: 54ty32157hua5534

Delete

BurstWires
- ☐ BlogBundle: Travel - Destination San Francisco

Blogs
- ☐ San Francisco Restaurant Reviews

Posts
- ☐ birth of san francisco #2

Content Preview

[Summaries ▼] [Preview]
- Summaries
- Headlines

Ebisu rated by: lafontaine Posted on 1/6/2006 5:56:22 PM
(from San Francisco Restaurant Reviews)
I was always told that fresh seafood is supposed to smell like the sea, fresh! Not last night! The maguro was off, not fresh! no excuse for a sushi restauant. When told them, they said "you're crazy" not would you like something else? I won't come back t...

La Palma Mexcatessen rated by: sfsappho Posted on 1/6/2006 5:56:22 PM
(from San Francisco Restaurant Reviews)
I really like this place. It has a very small grocery selection, and in the back is a counter where you can order taqueria selections of things like burrittos, enchiladas, etc. this place also makes it's own tortillas, chips, tamales, etc. very nice pe...

Pompei's Gotto rated by: kushnir Posted on 1/6/2006 5:56:22 PM
(from San Francisco Restaurant Reviews)
Do you ever look at the menu and try and figure out how they can do a good job on hundreds of items? They can't! Fisherman's Wharf on a beautiful days is something to savor! Visiting friends saw it at night, and demanded to see it by day! This place wa...

Done

*FIG. 4J*

BlogBurst

| My Library | Search | Reports | My Account | Help |

Search | Browse by Topic | Recommended | Most Popular

Joseph Publisher | Logout

Search

Results 1-10 of 10 for "travel"    Filter by: BurstWires | My Library | All Content

⊙ Posts  ○ Blogs

[travel]  [Search]

Add selected items to: [Choose Folder ▼]

Choose Folder
UT Longhorns
Celebrity Gossip
Music Folder
Shopping
Rose Bowl
Travel
Technology & Gadgets folder
Sports Folder
Food and Dining ☑ Lance's next riding partner: Bush 1/5/2006
Tour of Texas Cycling Podcast
Lance's next riding partner: Bush Lance's next rid
George W. Bush is getting plenty of bike time du
trails with seven-time Tour de France w...

☑ Chasing Lance on Travel Channel Dec 22 at
Tour of Texas Cycling Podcast
Chasing Lance film debuts on Travel Channel Th
Armstrong News on our Blog - The "docureality"
Networks Travel Channel will air on Thursday nig ☐ Watch the Tour de France in Austin Texas at Central Market 1/5/2006
Tour of Texas Cycling Podcast
TourWatch 2005 at Central Market - Sponsonr Site Listen to Tourwatch Podcasts
Video, Podcast and photo gallery  help Podcasts: Lance Armstrong does Q&A
Sitemap Podcast: TourWatch 2005 at Central Market Sponso...

☐ Chasing Lance 1/5/2006
Tour of Texas Cycling Podcast
Chasing Lance film debuts on Travel Channel Thursday Dec 22 at 7 pm CST Lance
Armstrong News on our Blog - The "docureality" show produced by the Discovery
Networks Travel Channel will air on Thursday night, Dec 22 on channel 58 (Grande...

☑ Sri Lanka becoming more popular 1/5/2006
Travel plan idea blog
The Tsunami hit Sri Lanka hard, but tourism is back. Vogue's October issue called the
island one of the winter's "coolest tropical getaways" while Conde Nast Traveller rated
it 11th in last month's 2005 Readers' Travel Awards. Udava Nanavakkara, chairman...

FIG. 4K

Travel
TRAVEL FEATURES

Cher Morean of Litchfield Park, Ariz., gets a look at Mt. St. Helens from 7 miles away at the Coldwater Ridge Visitor Center. *(AP photo by Elaine Thompson)*

Volcano at work
The first sighting from Washington Highway 504 tells the story in an instant. Round a bend and there, suddenly, a major star of the Cascade Range appears, a standout mountain poking through a gray blanket of foothills in the Gifford Pinchot national Forest: Mt. St. Helens National Volcanic Monument.

A 'grand' time in the Caribbean
Six ways to spend a thousand dollars, from one night to seven.

Sunday travel stories:

Promoting Ecuador beyond the Galapagos
The Galapagos Islands off the coast of Ecuador are among the world's most famous destinations, a once-in-a-lifetime trip for many travelers.

A friend of Abe's grand house in Bloomington, Ill.
Clover Lawn, the stately, 36-room mansion in the heart of this central Illinois town, bears mute testimony to the astonishing ascent of David Davis, an obstreperous kid from northeastern Maryland who grew up to become a well-regarded Illinois lawyer, judge, U.S. Supreme Court justice and U.S. senator.

News | Opinion
Local News
Nation/World News
Columnists
Special Reports
Multimedia
Obituaries

Business | Tech
News
Sports
Travel
Health
Education
Leisure
Food
Entertainment

Classified
Find a job
Find a car
Find real estate
Rent an apartment
Find a mortgage
Personals
Pets
Place an ad

Shopping
Sales & deals
Local stores
Yellow pages
Grocery coupons

Weather | Traffic

Photo gallery
Your photos

| Flight tracker | Weekly features |
|---|---|
| | News for travelers |
| | World watch |
| | Exchange rates |
| | Resourceful traveler |
| Track by airline, flight | 10 for the road |
| | GeoQuiz |

Powered by BlogBurst

Doggie-Friendly Ski Inns
from From: HotelChatter  posted 1/6/2006

Concierges Perform Long-Distance Coddling
from From: HotelChatter  posted 1/6/2006

Pompei's Grotto rated by: kushnir
from SF Restaurant Reviews posted 1/6/2006

La Palma Mexicatessen rated by: sfsappho
from SF Restaurant Reviews posted 1/6/2006

La Victoria Mexican Bakery rated by; sfsappho
from SF Restaurant Reviews posted 1/6/2006

Ebisu rated by: lafontaine
from SF Restaurant Reviews posted 1/6/2006

Dominguez Mexican Bakery rated by: sfsappho
from SF Restaurant Reviews posted 1/6/2006

Pembroke Pines: Judge Smails hasn't stayed

FIG. 4L

Austin Times - Mozilla Firefox

File Edit View Go Bookmarks Tools Help http://www.blogburst.com/AustinTimes/Sur

News | Opinion
Local News
Nation/World News
Columnists
Special Reports
Multimedia
Obituaries

Business | Tech
  News
Sports
Travel
Health
Education
Leisure
Food
Entertainment

Clasified
 Find a job
 Find a car
 Find real estate
 Rent an apartment
 Find a mortgage
 Personals
 Pets
 Place an ad

Shopping
 Sales & deals
 Local stores
 Yellow pages
 Grocery coupons

Weather | Traffic

Travel

TRAVEL FEATURES

Cher Morean of Litchfield Park, Ariz., gets a look at Mt. St. Helens from 7 miles away at the Coldwater Ridge Visitor Center. *(AP photo by Elaine Thompson)*

Volcano at work
The first sighting from Washington Highway 504 tells the story in an instant. Round a bend and there, suddenly, a major star of the Cascade Range appears, a standout mountain poking through a gray blanket of foothills in the Gifford Pinchot national Forest: Mt. St. Helens National Volcanic Monument.

A 'grand' time in the Caribbean
Six ways to spend a thousand dollars, from one night to seven.

Sunday travel stories:

Promoting Ecuador beyond the Galapagos
The Galapagos Islands off the coast of Ecuador are among the world's most famous destinations, a once-in-a-lifetime trip for many travelers.

A friend of Abe's grand house in Bloomington, Ill.
Clover Lawn, the stately, 36-room mansion in the heart of this central Illinois town, bears mute testimony to the astonishing ascent of David Davis, an obstreperous kid from northeastern Maryland who grew up to become a well-regarded Illinois lawyer, judge, U.S. Supreme Court justice and U.S. senator.

Photo gallery

Your photos

| Flight tracker | Weekly features |
|---|---|
| | News for travelers |
| | World watch |
| | Exchange rates |
| | Resourceful traveler |
| Track by airline, flight | 10 for the road |
| | GeoQuiz |

Powered by BlogBurst

Doggie-Friendly Ski Inns
Dogs are the new ski bunnies! The New York Times explores some of the dog-friendly bed-and-breakfasts and other ski inns on the East Coast and the West. Paw house Inn near...

Concierges Perform Long-Distance Coddling
People who need personal assistants, personal shoppers, and personal attention 24/7, are also the types to need concierges on-demand. The hotel industry has apparently cranked...

Pompei's Grotto rated by: kushnir
Do you ever look at the menu and try and figure out how they can do a good job on hundreds of items? They can't! Fisherman's Wharf on a beautiful days is something to savor!...

La Palma Mexicatessen rated by: sfsappho
I really like this place. It has a very small grocery selection, and in the back is a counter where you can order taqueria selections of things like Done

FIG. 4M

Travel

TRAVEL FEATURES

Powered by BlogBurst

Blog Article

New York: DeNiro's Tribeca Hotel Inches Towards Open by From: HotelChatter,
HotelChatter
Hotel Reviews and info Blogger testofwill snaps some day/night photos of DeNiro's $43 MM, six-story luxury hotel in TriBeCa--a work in progress Even though these photos only reveal that DeNiro's hotel is in a constant state of change, we say that puts him way ahead of the game, when you compare his hotel to the rest of the crew in the 2006 Manhattan hotel opening competition that is.

Hat Tip to Cityrag!

Related Stories:
DeNiro Tribeca Hotel Coverage [HotelChatter]

Posted 1/31/2006 5:22:00 PM

Categories: Travel

Sidebar (left)
News | Opinion
Local News
Nation/World News
Columnists
Special Reports
Multimedia
Obituaries

Business | Tech News
Sports
Travel
Health
Education
Leisure
Food
Entertainment

Clasified
Find a job
Find a car
Find real estate
Rent an apartment
Find a mortgage
Personals
Pets
Place an ad

Shopping
Sales & deals
Local stores
Yellow pages
Grocery coupons

Weather | Traffic

Photo gallery
Your photos

Flight tracker
Track by airline, flight

Weekly features
News for travelers
World watch
Exchange rates
Resourceful traveler
10 for the road
GeoQuiz

RELATED STORIES

Volcano at work
The first sighting from Washington Highway 504 tells the story in an instant. Round a bend and there, suddenly, a major star of the Cascade Range appears, a standout mountain poking through a gray blanket of foothills in the Gifford Pinchot National Forest: Mt. St. Helens National Volcanic Monument.

Promoting Ecuador beyond the Galapagos
The Galapagos Islands off the coast of Ecuador are among the world's most famous destinations, a once-in-a-lifetime trip for many travelers.

A friend of Abe's grand house in Bloomington, Ill.
Clover Lawn, the stately, 36-room mansion in the heart of this central Illinois town, bears mute testimony to the astonishing ascent of David Davis, an obstreperous kid from northeastern Maryland who grew up to become a well-regarded Illinois lawyer, judge, U.S. Supreme Court justice and U.S. senator.

BlogBurst: Blog Profile - Mozilla Firefox

File  Edit  View  Go  Bookmarks  Tools  Help  delicio.us http://app.blogburst.com/Workber  subversion bluehost

BlogBurst

| Admin | Editorial | My Library | My Blogs | Content | Reports | My Account | D |

Browse | Search | Pluck Editorial Catalog | Browse by Metro

Duane Fields | Logout

Blog Profile

The Apple Blog

Rating: ☆ ☆ ☆ ☆    New Rating: ☆ ☆ ☆ ☆   It's OK

Activated ▼   delete | edit

Add to... ▼

(TAB)

Rating: The Apple Blog
Blog Url: http://www.theappleblog.com/
Feed url: http://www.theappleblog.com/feed/
Short Description: The Apple Blog, published by and for the day-to-day Apple user, is a prominent source for news, reviews, walkthroughs, and real life application of all Apple products.
View Blogger Profile
Blog Id: B9DUGMhwTGZf5vTNcZlSh3u
Summary: The Apple Blog, published by and for the day-to-day Apple user, is a prominent source for news, reviews, walkthroughs, and real life application of all Apple products.
Tags: apple, mac, technology, gadgets, news, reviews
Categories: Technology > Web 2.0 & Internet
Locale:
Comments:
Recent Activity:

Last Attempted Refresh:  1/24/2007  3:36:31  PM  GMT
Last Successful Refresh:  1/24/2007  3:36:24  PM  GMT
          Total Posts:  486

Posting Activity

Done

```
BlogBurst: Folder Detail - Mozilla Firefox                    _ □ ×
File  Edit  View  Go  Bookmarks  Tools  Help
◁▾ ▷▾ ⟳ ⊗ ⌂  [ http://meatwad.hq.pluck.com/Psn/Workben ▼] ⊙ Go
```

BlogBurst

| Editorial | My Library | Search | Reports | My Account | Help |

My Folders | My BurstWires | What's New

Organizer Bob | Logout

Folder Detail

Folder Name: [Travel]  [rename]

Description: [Contains travel blogs and articles.]

[update]

Folder Sources

Blogs            Publish Selected Items To: [Choose BurstWire ▼] | Delete
                                                  Choose BurstWire
☑ 🗋 San Francisco Restaurant Reviews              Travel-Front page
☑ 🗋 Fodor's Travel Wire                           Sports-Sidebar
☐ 🗋 HotelChatter
☐ 🗋 hobotraveler.com travel blog at Yohoo! Groups

Posts
☑ 🗎 birth of san francisco #2

Content Preview

[Summaries ▼] [Preview]

Hotel Safety Gadgets Posted on 1/31/2006 3:22:12 PM
(from HotelChatter)
One can never be safe enough, and if you are a smart packer... you should have room for some extra-safe hotel gadgets. Paranoid parents, extra safe students, and wise women, check these out: If you are on a budget, and it doesn't include rooms with locks...

London: Free Hotel Nights In London Posted on 1/31/2006 3:22:12 PM
(from HotelChatter)
Free hotel rooms are always a good thing, especially when you are already buying discounted air tickets. British Airways' "London For Free" promotion rocks. The deal offers two free nights' hotel accomodations in the central part of the city when you pu...

Kabul: Kabul This Spring? Posted on 1/31/2006 3:22:12 PM
(from HotelChatter)
Afghanistan is trying to forge ahead, five stars at a time. The first live star hotel recently opened in November 2005 in Kabul, and despite being reportedly beautiful, it's also very quiet. (Notice the Done

FIG. 5N

```
BlogBurst: BurstWire Detail - Mozilla Firefox                    _ □ X
File  Edit  View  Go  Bookmarks  Tools  Help
◁ ▷ ⊙ ⊗ ⌂  [ http://meatwad.hq.pluck.com/Psn/Workben ▽ ] ⊙ Go
```

BlogBurst

| Editorial | My Library | Search | Reports | My Account | Help |

My Folders | My BurstWires | What's New

Organizer Bob | Logout

BurstWire Detail

[Burst Wire image]

BurstWire Name: [Travel-Front page]  [rename]

Description: [This BurstWire will be best for front page travel sections on Distributor's online newspapers and magazines.
Note: We need to add more blogs about beach resorts.]

[update]

BurstWire Image: [_____] [Browse...] [upload]

BurstWire Sources

Delete

Blogs

- ☐ 📄 San Francisco Restaurant Reviews
- ☐ 📄 Fodor's Travel Wire
- ☐ 📄 HotelChatter
- ☐ 📄 hobotraveler.com travel blog at Yohoo! Groups

Posts

- ☐ 📄 birth of san francisco #2

Content Preview

[Summaries ▽] [Preview]

Hotel Safety Gadgets  Posted on 1/31/2006  3:22:12 PM
(from HotelChatter)
One can never be safe enough, and if you are a smart packer... you should have room for some extra-safe hotel gadgets. Paranoid parents, extra safe students, and wise women, check these out: If you are on a budget, and it doesn't include rooms with locks...

London: Free Hotel Nights In London  Posted on 1/31/2006  3:22:12 PM
(from HotelChatter)
Free hotel rooms are always a good thing, especially when you are already buying discounted air tickets. British Airways' "London For Free" promotion rocks. The deal offers two free nights' hotel accomodations in the central part of the city when you pu...

Done

METHOD, SYSTEM, AND COMPUTER PROGRAM PRODUCT FOR MANAGING INFORMATION IN A COMPUTER NETWORK

BACKGROUND

The present disclosure relates in general to information handling systems, and in particular to a method, system and computer program product for managing information in a computer network. A Transport Control Protocol/Internet Protocol ("TCP/IP") network, such as the Internet or an intranet, is an example of a computer network. A user may prefer to manage information in the computer network. Such managing allows the user to navigate the computer network in a more efficient manner.

SUMMARY

From respective web sites of multiple contributors, via a computer network: at least one information handling system receives and stores content, automatically and repeatedly, so that the stored content contemporaneously includes updates thereof from the web sites of the contributors. The receiving and storing of the content occurs under first license agreements that permit redistribution of the content. From a distributor, via the computer network: the at least one information handling system receives and stores a specification of a portion of the content and of a manner in which the portion is to be displayed in a web site of the distributor. To the web site of the distributor, via the computer network: the at least one information handling system outputs the portion of the content in accordance with the specification, automatically and repeatedly, so that the output portion of the content contemporaneously includes updates thereof from the web sites of the contributors. The outputting of the portion of the content occurs under a second license agreement that governs redistribution of the content.

BRIEF DESCRIPTION OF THE DRAWING

FIG. 3B is an illustration of a screen displayed by a display device of a representative first IHS of FIG. 1.

FIG. 3J is an illustration of a screen displayed by a display device of a representative first IHS of FIG. 1.

FIG. 3L is an illustration of a screen displayed by a display device of a representative first IHS of FIG. 1.

FIG. 3M is an illustration of a screen displayed by a display device of a representative first IHS of FIG. 1.

FIG. 3O is an illustration of a screen displayed by a display device of a representative first IHS of FIG. 1.

FIG. 3R is an illustration of a screen displayed by a display device of a representative first IHS of FIG. 1.

FIG. 3T is an illustration of a screen displayed by a display device of a representative first IHS of FIG. 1.

FIG. 3U is an illustration of a screen displayed by a display device of a representative first IHS of FIG. 1.

FIG. 4A is an illustration of a screen displayed by a display device of a representative third IHS of FIG. 1.

FIG. 4F is an illustration of a screen displayed by a display device of a representative third IHS of FIG. 1.

FIG. 4J is an illustration of a screen displayed by a display device of a representative third IHS of FIG. 1.

FIG. 4K is an illustration of a screen displayed by a display device of a representative third IHS of FIG. 1.

FIG. 4L is an illustration of a screen displayed by a display device of a representative third IHS of FIG. 1.

FIG. 4M is an illustration of a screen displayed by a display device of a representative third IHS of FIG. 1.

FIG. 4N is an illustration of a screen displayed by a display device of a representative third IHS of FIG. 1.

FIG. 4O is an illustration of a screen displayed by a display device of a representative third IHS of FIG. 1.

FIG. 5I is an illustration of a screen displayed by a display device of a representative second IHS of FIG. 1.

FIG. 5L is an illustration of a screen displayed by a display device of a representative second IHS of FIG. 1.

FIG. 5M is an illustration of a screen displayed by a display device of a representative second IHS of FIG. 1.

FIG. 5N is an illustration of a screen displayed by a display device of a representative second IHS of FIG. 1.

DETAILED DESCRIPTION

Figure 1:
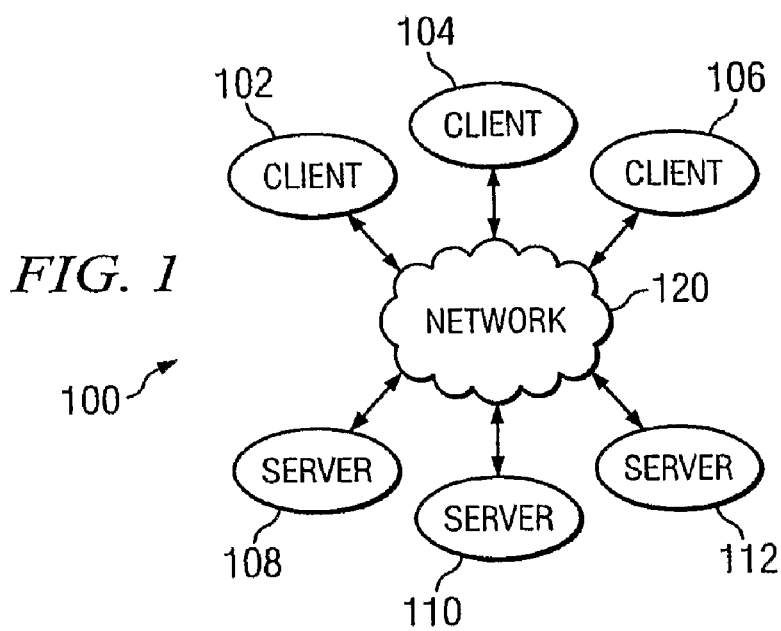
FIG. 1 is a block diagram of a system according to the illustrative embodiment.

FIG. 1 is a block diagram of a system, indicated generally at 100, according to the illustrative embodiment. The system 100 includes clients 102, 104 and 106, each for executing respective client processes as discussed further hereinbelow. Further, the system 100 includes (a) a global computer network 120, such as a Transport Control Protocol/Internet Protocol ("TCP/IP") network 120 (e.g., the Internet or an intranet), and (b) servers 108, 110 and 112 for executing respective server processes as discussed further hereinbelow.

Each of the clients 102, 104 and 106, and the servers 108, 110 and 112, includes a respective network interface for communicating with the network 120 (i.e. outputting information to, and receiving information from, the network 120), such as by transferring information (e.g., instructions, data, signals) between such client (or server) and the network 120. Each of the clients 102, 104 and 106, the network 120, and the servers 108, 110 and 112 is an information handling system ("IHS") that includes at least one respective computing device (e.g., computer) for executing a respective process and performing respective operations (e.g., processing and communicating information) in response thereto as discussed further hereinbelow. Each such IHS and computing device is formed by various electronic circuitry components.

Also, as shown in FIG. 1, the servers 108, 110 and 112 are coupled through the network 120 to one another, and to the clients 102, 104 and 106. Through the network 120, information is communicated by the servers 108, 110 and 112, and by the clients 102, 104 and 106, to one another. In the discussion hereinbelow: (a) the client 102 is a representative one of clients 102, 104 and 106; and (b) the server 108 is a representative one of the servers 108, 110 and 112. Although FIG. 1 shows only three clients (i.e., clients 102, 104 and 106), other clients (substantially identical to the clients 102, 104 and 106) are connectable to network 120. Similarly, although FIG. 1 shows only three servers (i.e., servers 108, 110 and 112), other servers (substantially identical to the servers 108, 110 and 112) are connectable to the network 120 for information serving, load balancing, and various other operations of the system 100.

Figure 2:
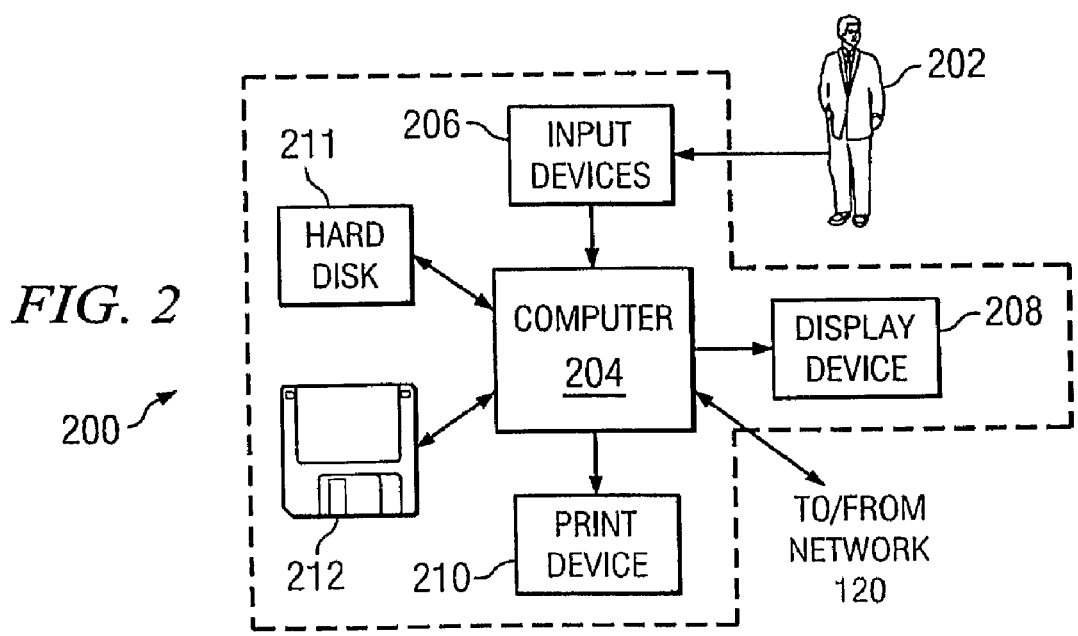
FIG. 2 is a block diagram of a representative client of the system of FIG. 1.

FIG. 2 is a block diagram of a representative IHS (e.g., client 102) of the system 100. Such representative HIS is indicated by a dashed enclosure 200. Each IHS of FIG. 1 operates in association with a respective human user. Accordingly, in the example of FIG. 2, the IHS 200 operates in association with a human user 202, as discussed further hereinbelow.

As shown in FIG. 2, the IHS 200 includes (a) input devices 206 for receiving information from the user 202, (b) a display device 208 (e.g., a conventional electronic cathode ray tube ("CRT") device) for displaying information to the user 202, (c) a computer 204 for executing and otherwise processing instructions, (d) a print device 210 (e.g., a conventional electronic printer or plotter) for printing visual images on paper, (e) a nonvolatile storage device 211 (e.g., a hard disk drive or other computer-readable medium (or apparatus), as discussed further hereinbelow) for storing information, (f) a computer-readable medium (or apparatus) 212 (e.g., CD-ROM) for storing information, and (g) various other electronic circuitry for performing other operations of the IHS 200.

For example, the computer 204 includes (a) a network interface (e.g., circuitry) for communicating between the computer 204 and the network 120 and (b) a memory device (e.g., random access memory ("RAM") device and read only memory ("ROM") device) for storing information (e.g., instructions executed by the computer 204 and data processed by the computer 204 in response to such instructions). Accordingly, the computer 204 is connected to the network 112, the input devices 206, the display device 208, the print device 210, the storage device 211, and the computer-readable medium 212, as shown in FIG. 2.

In response to signals from the computer 204, the display device 208 displays visual images, and the user 202 views such visual images. Moreover, the user 202 operates the input devices 206, in order to output information to the computer 204, and the computer 204 receives such information from the input devices 206. Also, in response to signals from the computer 204, the print device 210 prints visual images on paper, and the user 202 views such visual images.

The input devices 206 include, for example, a conventional electronic keyboard or keypad and a pointing device, such as a conventional electronic "mouse," rollerball, or light pen. The user 202 operates the keyboard or keypad, in order to output alphanumeric text information to the computer 204, which receives such alphanumeric text information. The user 202 operates the pointing device, in order to output cursor-control information to the computer 204, and the computer 204 receives such cursor-control information. The input devices 206 also include, for example, touch-sensitive circuitry of a liquid crystal display ("LCD") device.

The system 200 is operable to receive, store (e.g., in a computer-readable medium) and display web pages from Internet sites ("web sites"), which are hosted by various servers (e.g., servers 108, 110 and 112), respectively. For example, as discussed further hereinbelow in connection with FIGS. 3A-U, 4A-Q, and 5A-N, the computer 204 executes a program for displaying the web pages in response to requests from the user 202.

Representative first information handling systems (e.g., such as the client 102) of FIG. 1 operate in association with representative first human users ("contributors" a/k/a "bloggers"), respectively, to manage web pages of representative first web sites (e.g., such as the web site that is hosted by the server 108). In one example, the first web sites are publicly accessible. In another example, some or all of the first web sites are password-protected or otherwise secured for restricting access to only authorized individuals and/or authorized entities.

Representative second information handling systems (e.g., such as the client 104) of FIG. 1 operate in association with representative second human users ("organizers" a/k/a "editors"), respectively, to manage web pages of a second web site that is hosted by the server 110 ("BlogBurst server").

Representative third information handling systems (e.g., such as the client 106) of FIG. 1 operate in association with representative third human users ("distributors" a/k/a "publishers"), respectively, to manage web pages of representative third web sites (e.g., such as the web site that is hosted by the server 112). For example, distributors include third party operators of news web sites.

Figure 3A:
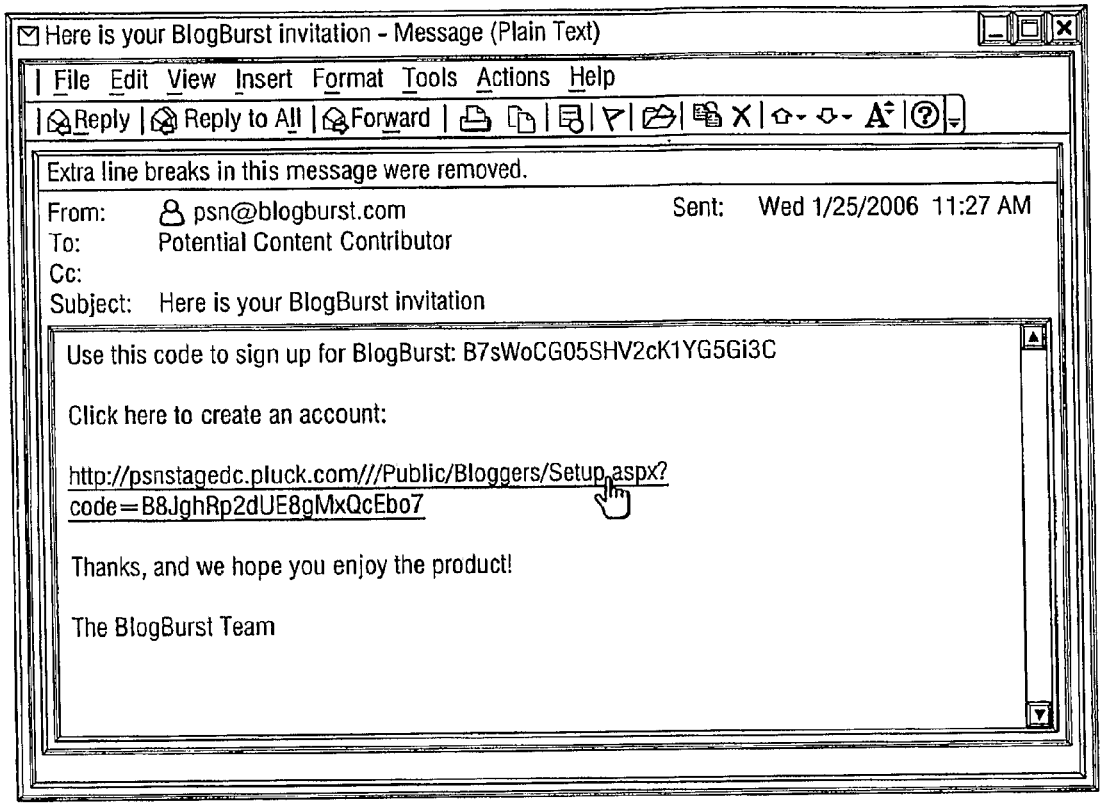
FIG. 3A is an illustration of a screen displayed by a display device of a representative first information handling system ("IHS") of FIG. 1.

FIGS. 3A-U are illustrations of screens displayed by a display device of a representative first IHS ("contributor's IHS"), in response to signals (which represent information, such as instructions and data) that the contributor's IHS receives from the Blog Burst server via the network 120. Using a representative second IHS ("organizer's IHS"), an organizer enters an e-mail address of a selected contributor into a web-based form and causes the organizer's IHS to transmit the e-mail address to the BlogBurst server via the network 120. The BlogBurst server receives the email address and, in response thereto, outputs an e-mail message (as shown in FIG. 3A) to the selected contributor.

The e-mail message invites the contributor to join a "Blog-Burst" community, which is managed by the BlogBurst server. Such community receives benefits of various services that are provided by the BlogBurst server, as described further hereinbelow. The e-mail message invites the contributor to click a customized link that contains a system-generated unique identification ("ID") invitation code (as shown in FIG. 3A). In response to the contributor clicking such link (which requests a web page from the BlogBurst server), the Blog-Burst server (via such web page) prompts the contributor (via a web browsing program that is executed by the contributor's IHS) to voluntarily provide account registration information to the BlogBurst server via the network 120 (as shown in FIG. 3B), in order to join the BlogBurst community. In this manner, various contributors enter account settings and user information to describe themselves.

As shown in FIG. 3B, a contributor: (a) provides account setup and login information; and (b) accepts and agrees to an end user license agreement ("EULA") between such contributor and the BlogBurst server's governing organization. The EULA specifies various obligations, access rights, distribution rights, and other rights that are automatically (under the EULA) imposed upon and granted to the BlogBurst community's registered users (such as its registered distributors). Such rights include rights to receive, reproduce, distribute and perform various other activities with the contributor's content, such as a limited distribution license for sublicensing the contributor's whole or partial content collections to distributors for republication on the distributors' web sites. In accordance with the EULA, such activities are performed and managed via controls and transformations, in response to the BlogBurst server's execution of a software program.

Figure 3C:
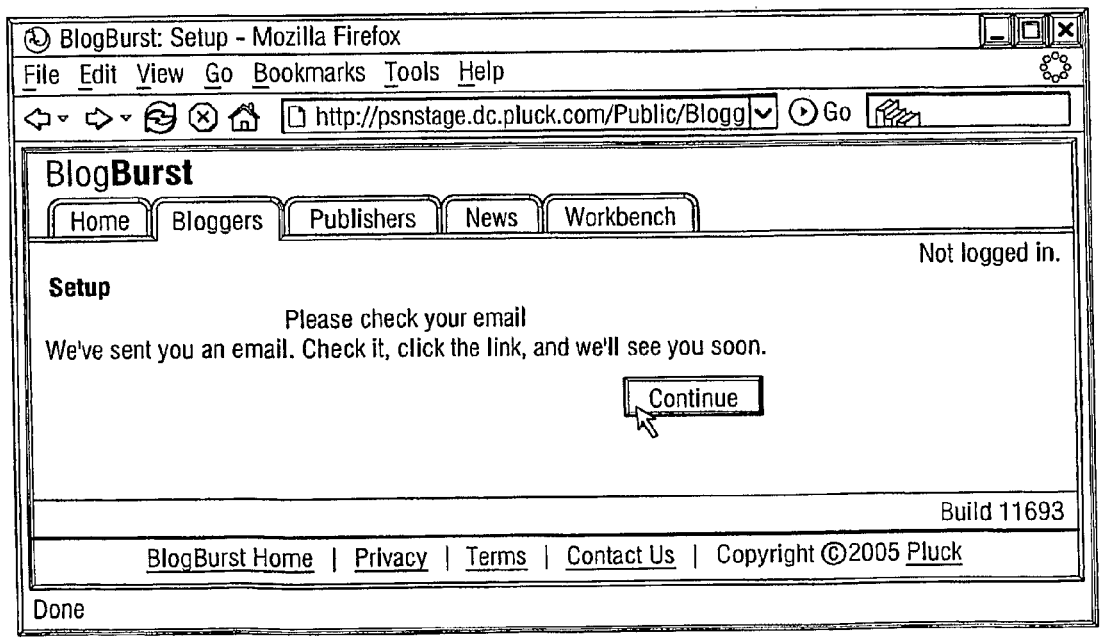
FIG. 3C is an illustration of a screen displayed by a display device of a representative first IHS of FIG. 1.
Figure 3D:
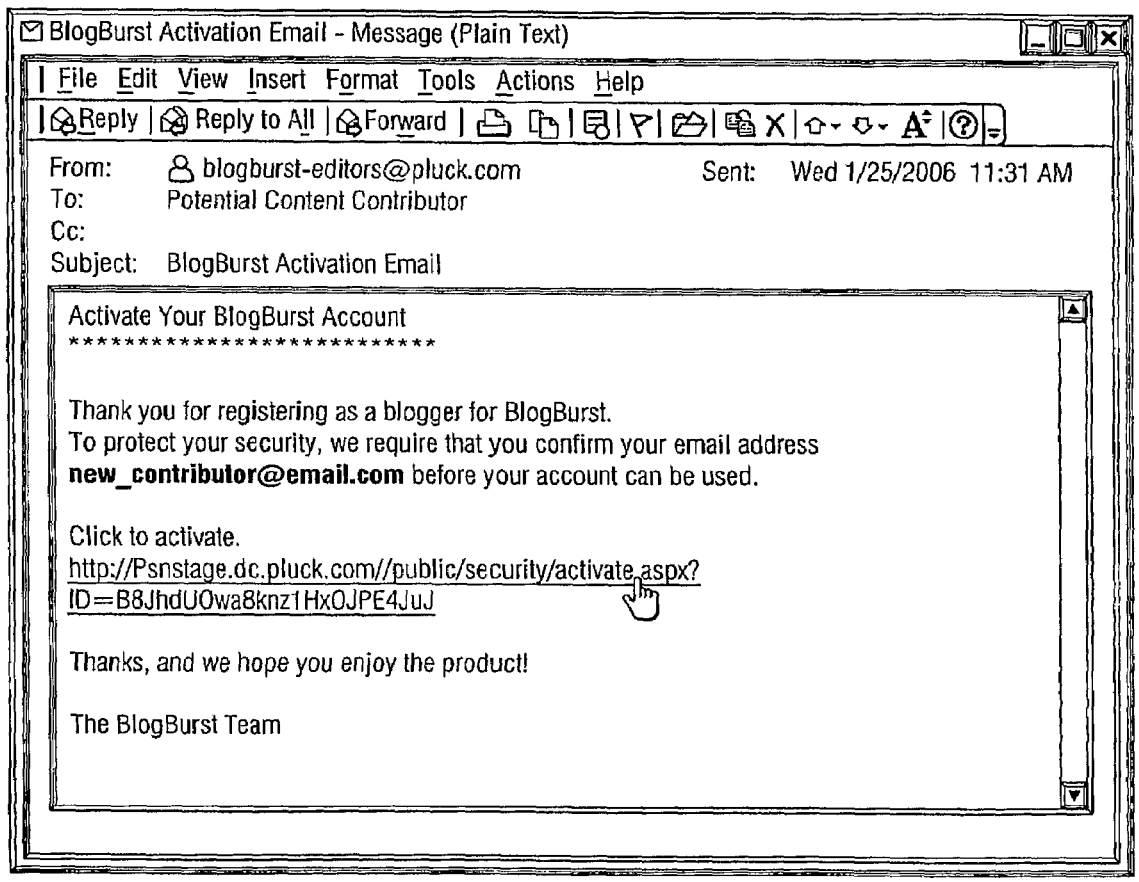
FIG. 3D is an illustration of a screen displayed by a display device of a representative first IHS of FIG. 1.

In response to account registration information from the user (e.g., the registered contributor), the BlogBurst server: (a) stores the users account registration information; and (b) performs an additional e-mail address verification by asking for the user's reply to an additional e-mail message (as shown in FIG. 3C). As shown in FIG. 3D, the user replies to the additional e-mail message by clicking a uniquely-generated link ID to formally activate the user's account, and the BlogBurst server registers such activation by recording such reply, which is embedded in a web formatted uniform resource identifier ("URI").

Figure 3E:
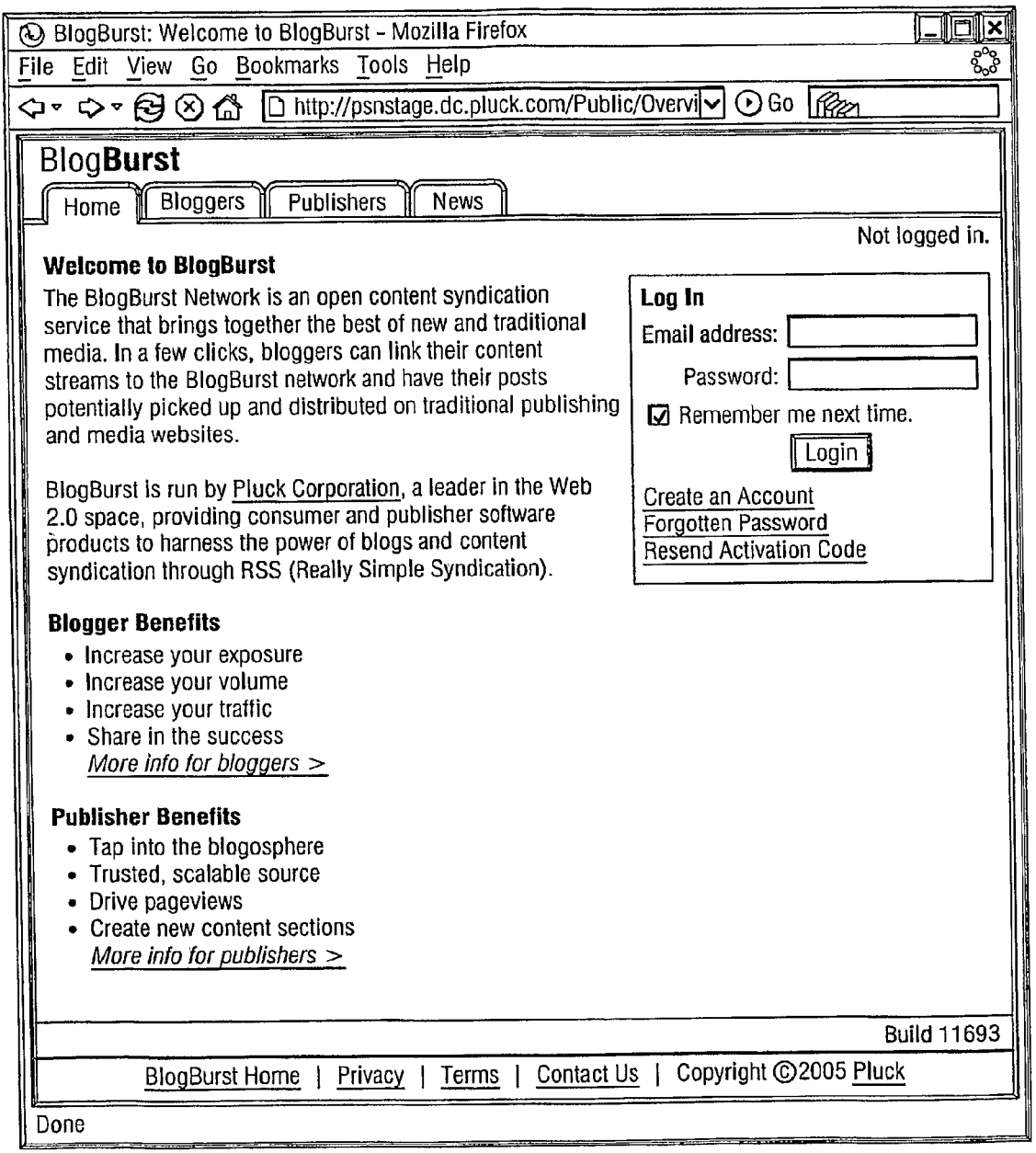
FIG. 3E is an illustration of a screen displayed by a display device of a representative first IHS of FIG. 1.
Figure 3F:
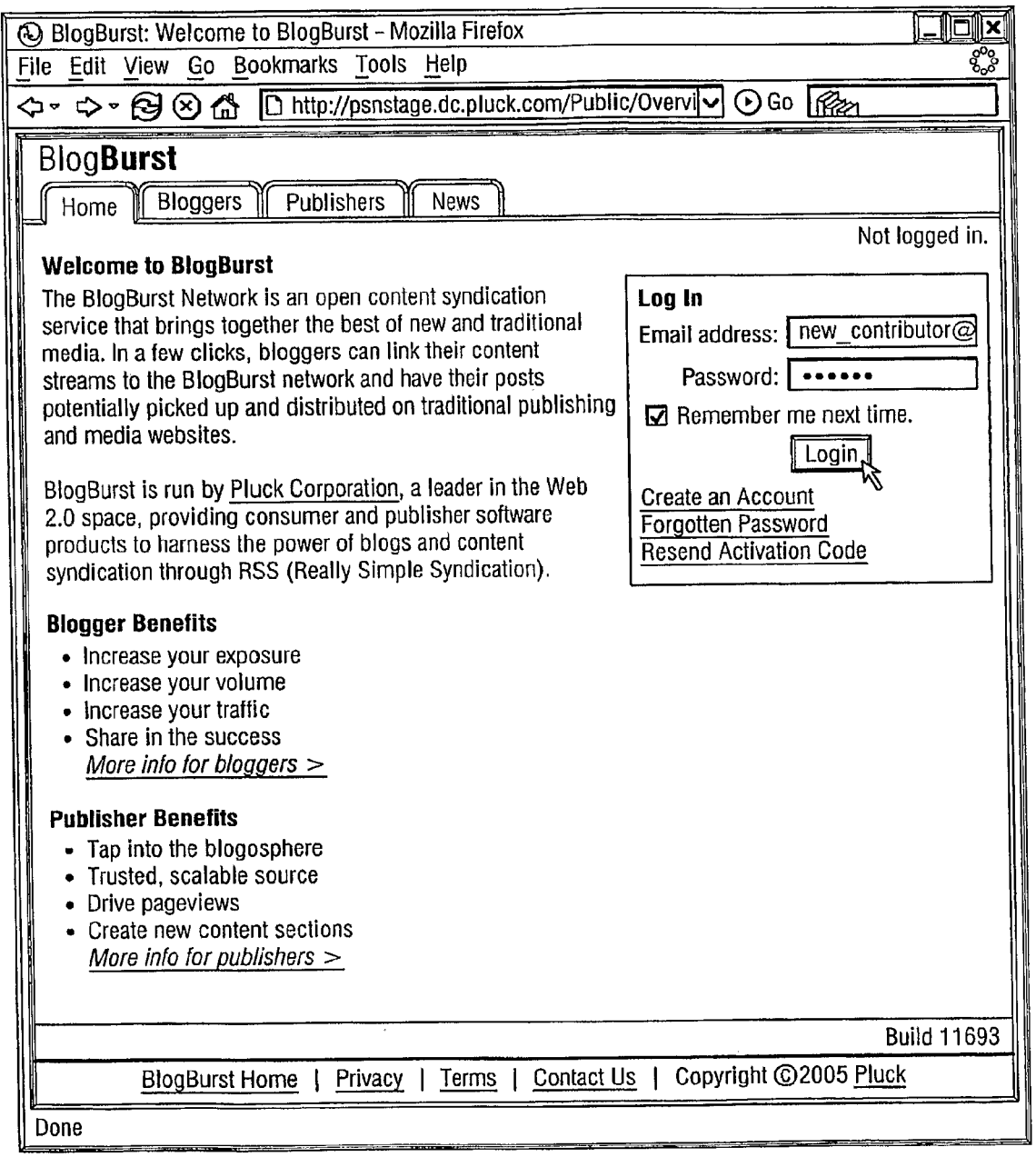
FIG. 3F is an illustration of a screen displayed by a display device of a representative first IHS of FIG. 1.
Figure 3G:
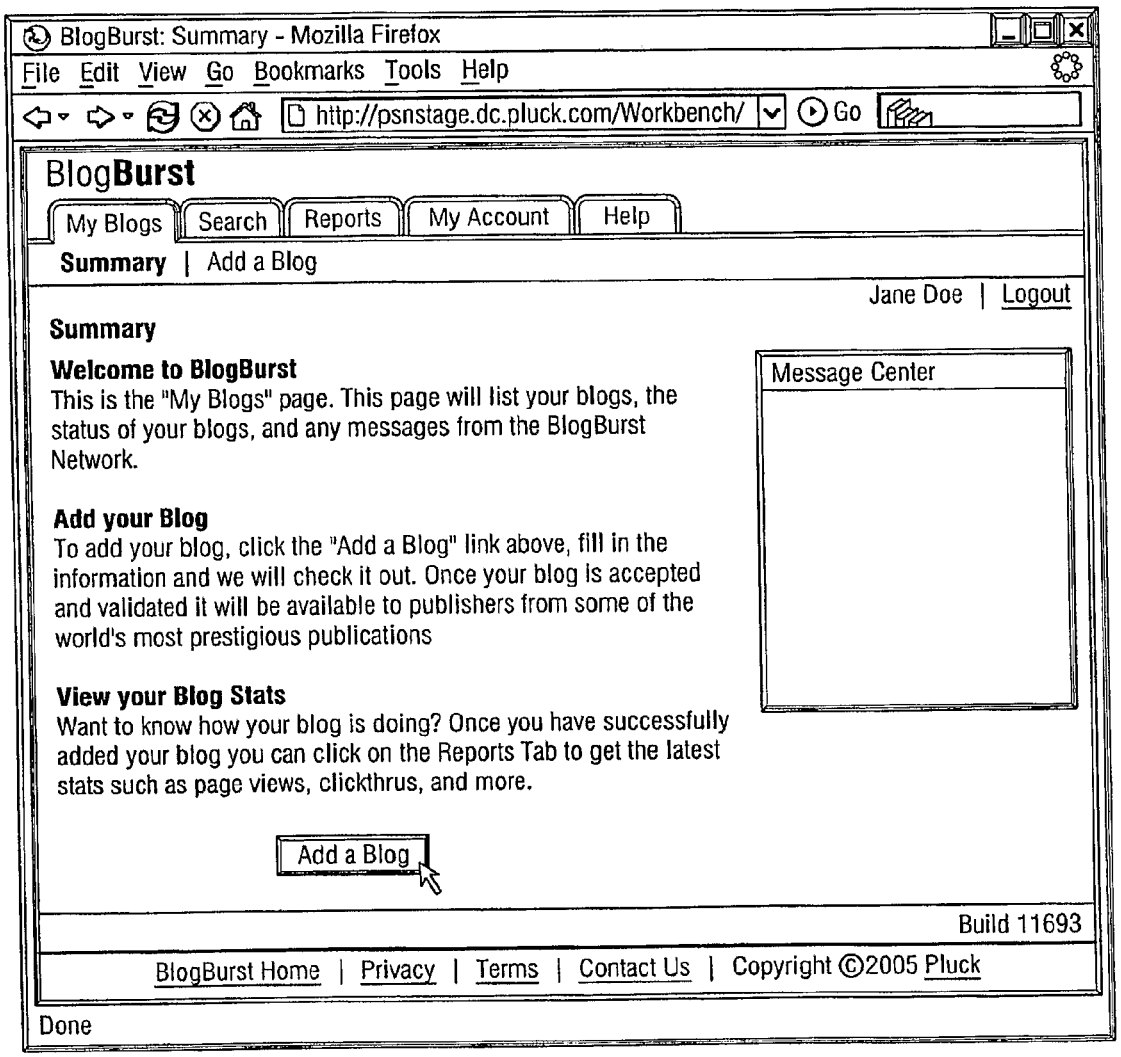
FIG. 3G is an illustration of a screen displayed by a display device of a representative first IHS of FIG. 1.

In response to such activation, the BlogBurst server saves the account registration information and prompts the contributor to log into the BlogBurst server (as shown in FIG. 3E) and to save a browser cookie on the contributor's IHS for enabling automatic identification by the BlogBurst server on the contributor's subsequent visits from the same IHS (as shown in FIG. 3F). After the user is verified, activated and logged into the BlogBurst server, the BlogBurst server prompts the contributor to add its content collection (e.g., a "blog") to the BlogBurst community's information set, in addition to descriptive and annotative information that describes such content collection (as shown in FIG. 3G).

Figure 3H:
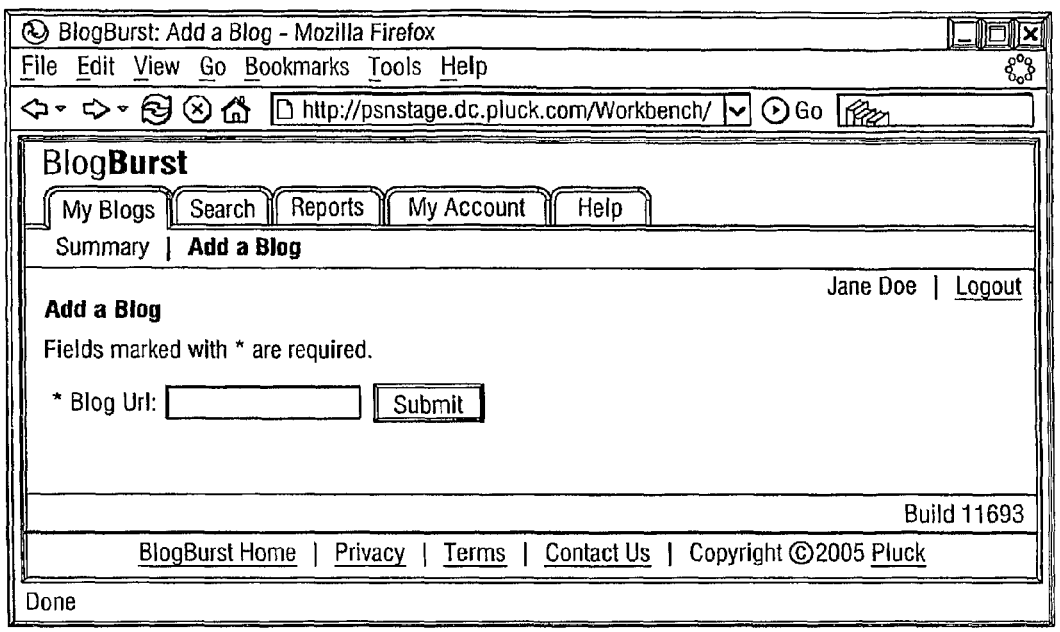
FIG. 3H is an illustration of a screen displayed by a display device of a representative first IHS of FIG. 1.
Figure 3I:
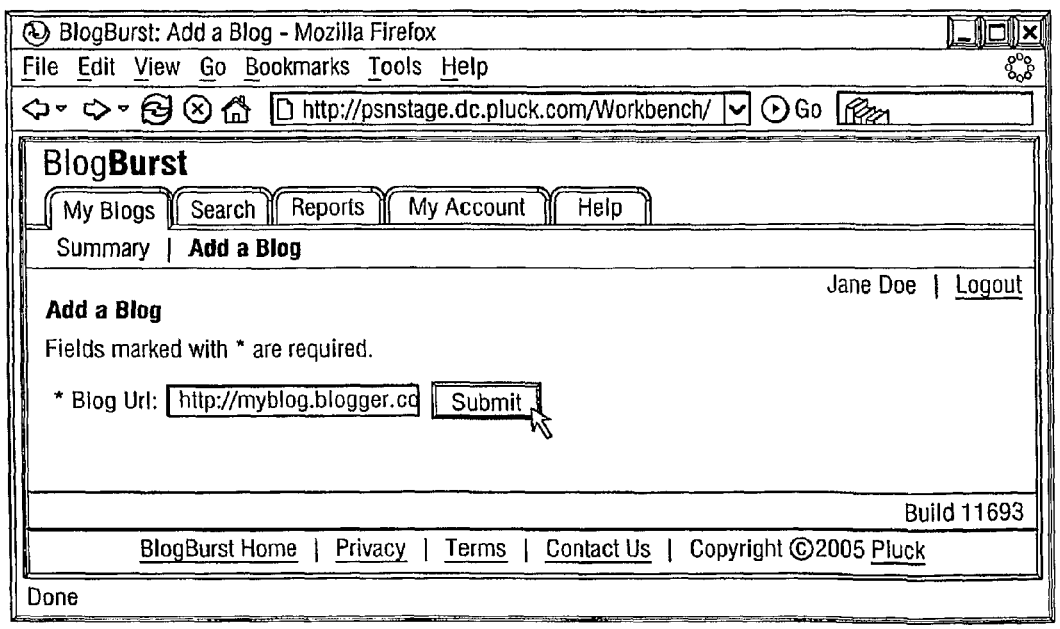
FIG. 3I is an illustration of a screen displayed by a display device of a representative first IHS of FIG. 1.

The BlogBurst server prompts the contributor to enter a "Blog URL" for a content collection to be added to the BlogBurst community (as shown in FIGS. 3H and 3I). In response to the contributor specifying a URL for a content collection, the BlogBurst server automatically performs a remote, automatic search of the user's provided content collection (via the network 120) to determine: (a) whether a syndication feed of such content collection is available; (b) the XML format of the syndication feed; and (c) the types of information provided in the discovered syndication feeds.

Figure 3J:
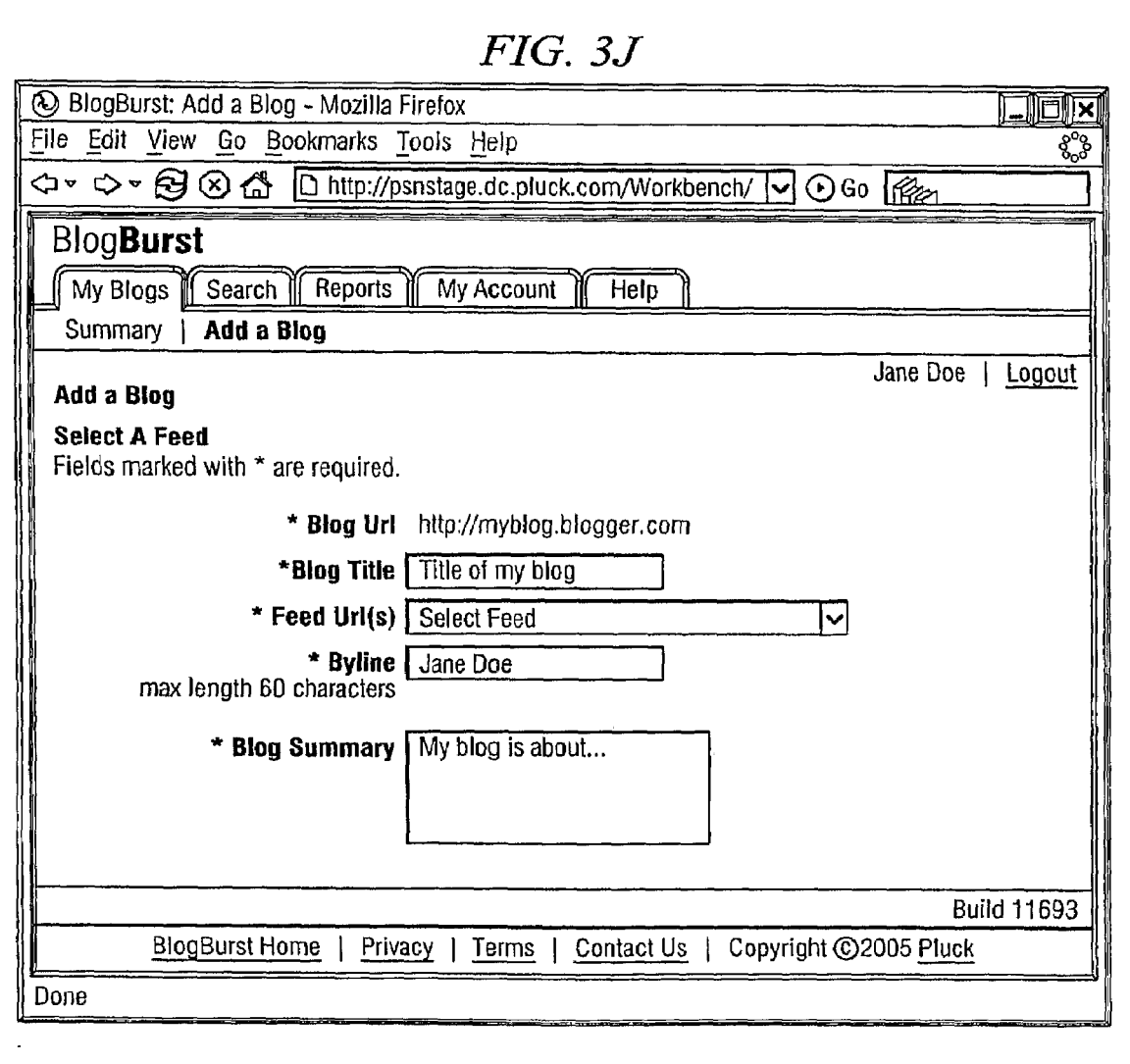
Figure 3K:
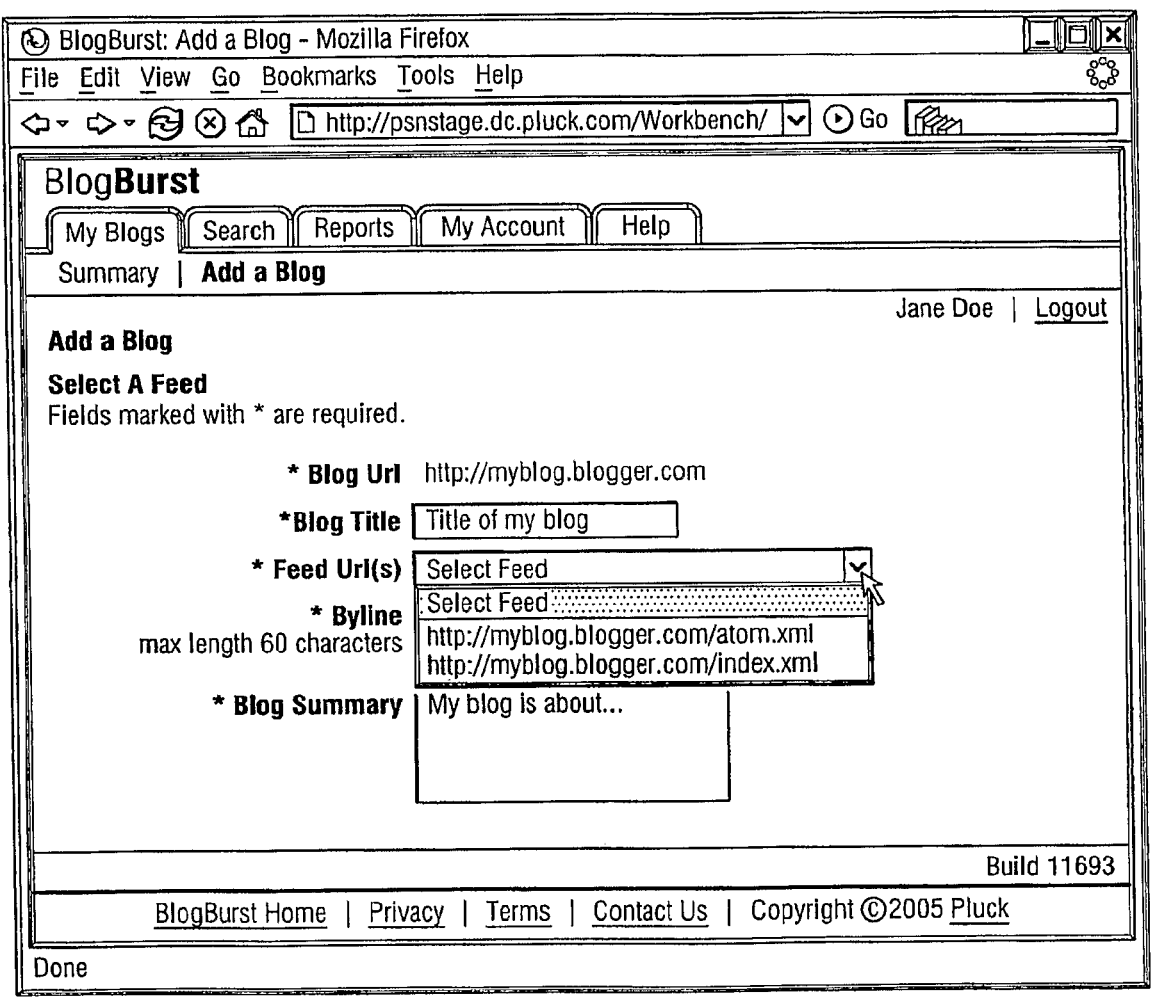
FIG. 3K is an illustration of a screen displayed by a display device of a representative first IHS of FIG. 1.

If the BlogBurst server discovers one or more syndication feeds as part of the content collection, the BlogBurst server prompts the contributor to select the desired syndication feed and enter additional descriptive and annotative information about the content collection (as shown in FIGS. 3J and 3K).

Conversely, if the BlogBurst server does not discover at least one syndication feed as part of the content collection, the Blog Burst server prompts the contributor to enter the specific URL of the syndication feed and enter additional descriptive and annotative information about the content collection (as shown in FIG. 3L).

In response to the contributor selecting or specifying a syndication feed, the BlogBurst server: (a) verifies, logs and generates a preview of the syndication feed contents; and (b) via the network 120, outputs such preview to the contributor's IHS for display to the contributor (as shown in FIG. 3M). If the preview describes the contributor's previously specified format of the contributor's content collection, the contributor outputs (to the BlogBurst server via the network 120) a validation of such fact by clicking a "Next (Claim Blog)" button (as shown in FIG. 3M). In response to such validation, the BlogBurst server outputs (via the network 120) a summary page to the contributor's IHS for display to the contributor, so that the summary page indicates that the content collection is ready to be claimed by the contributor and annotated for the benefit of organizers and distributors (as shown in FIG. 3N).

Figure 3N:
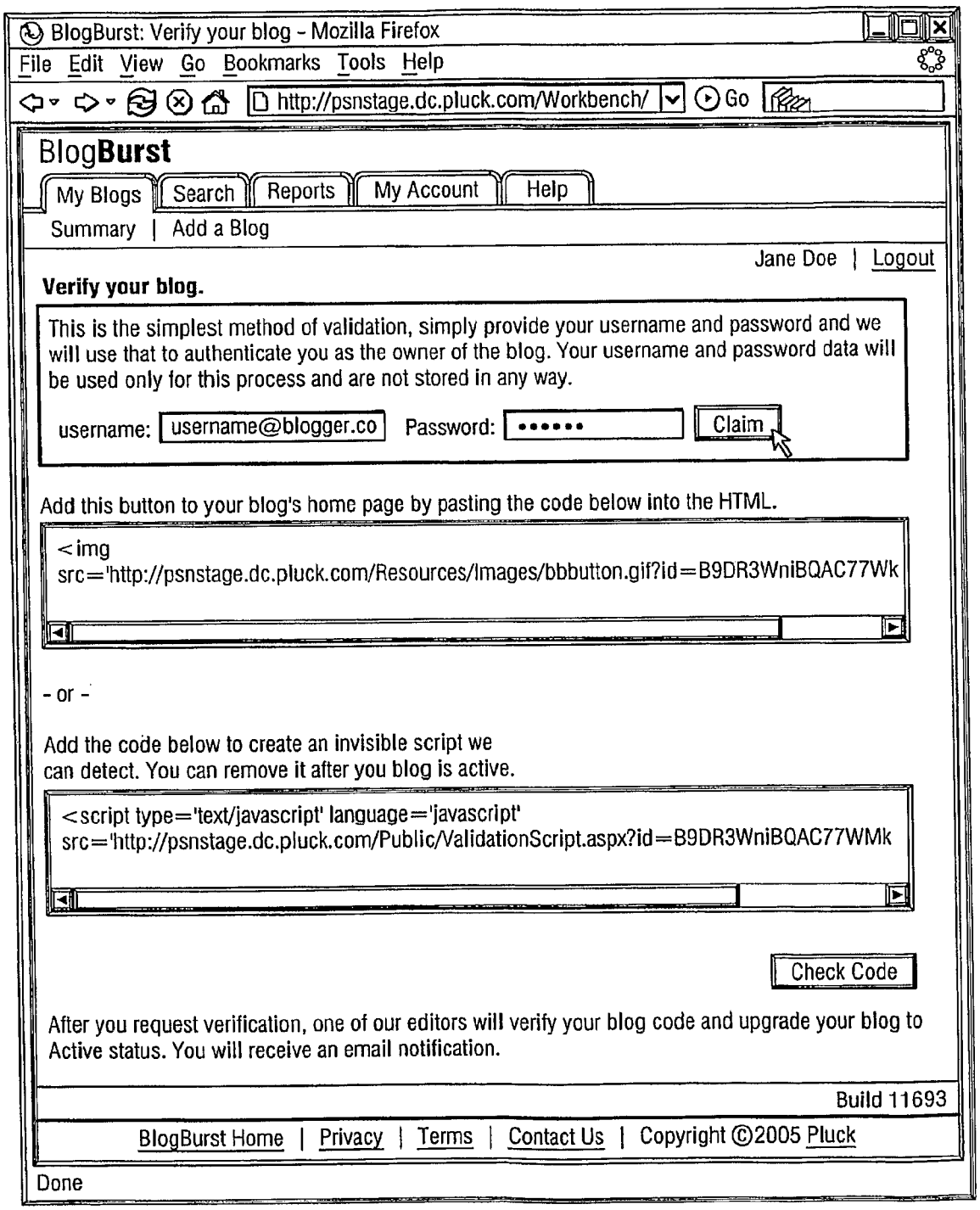
FIG. 3N is an illustration of a screen displayed by a display device of a representative first IHS of FIG. 1.
Figure 30:
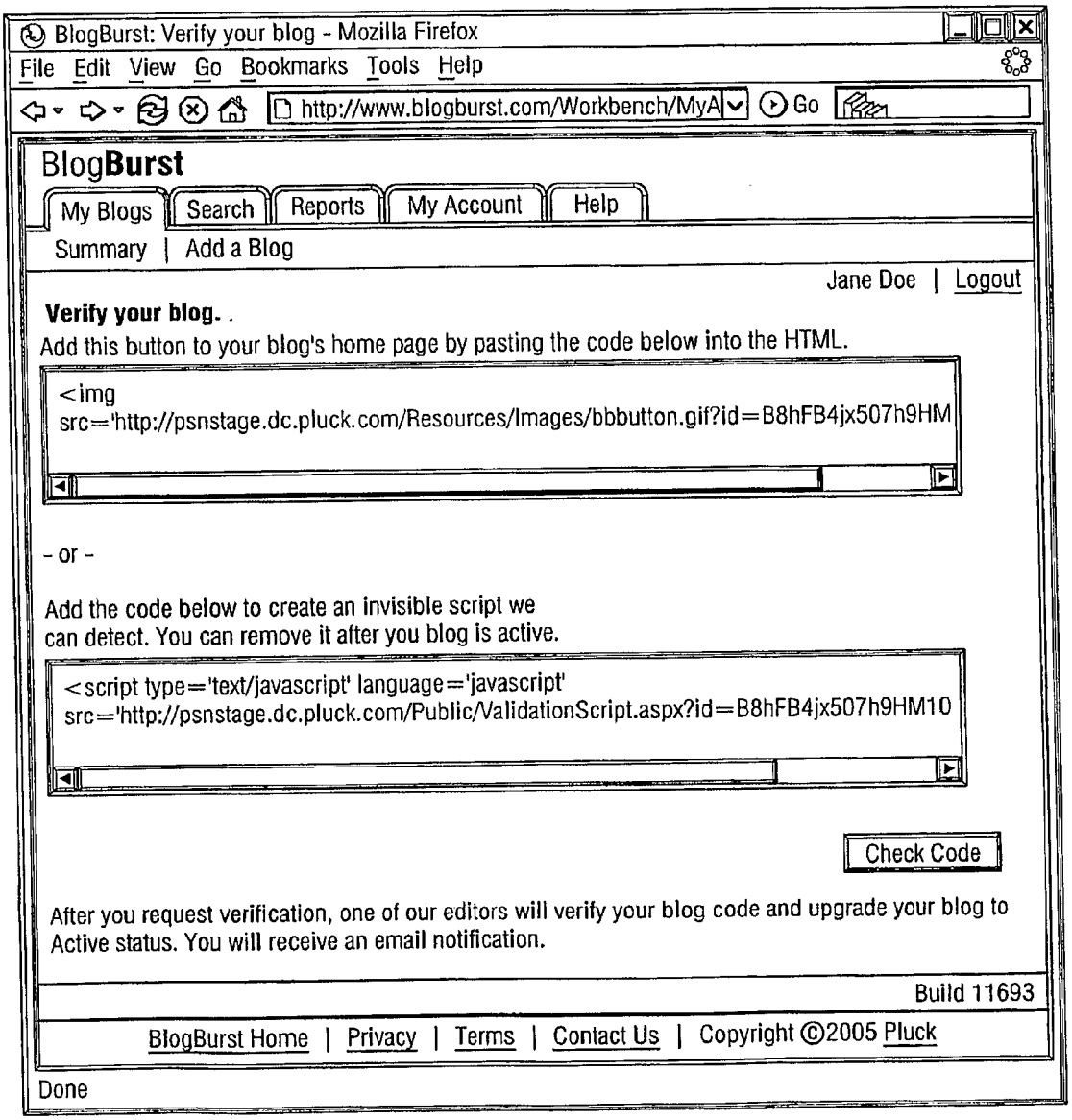

By clicking a "Claim" button (as shown in FIG. 3N), the contributor outputs (from the contributor's IHS to the BlogBurst server via the network 120) a claim to the content collection. In response to such claim, the Blog Burst server prompts the contributor to evidence that the contributor can and does operate the content collection, by the contributor's choice of: (a) inserting a specific selection of code in a particular content unit within the content collection (as shown in FIG. 3O); (b) claiming the content collection through a third-party aided authentication service (as shown in FIG. 3O); or (c) automated communication (e.g., in response to executing instructions of an application programming interface) between the contributor's IHS (or a server that stores the content collection on behalf of the contributor) and the BlogBurst server, according a predetermined protocol.

Figure 3P:
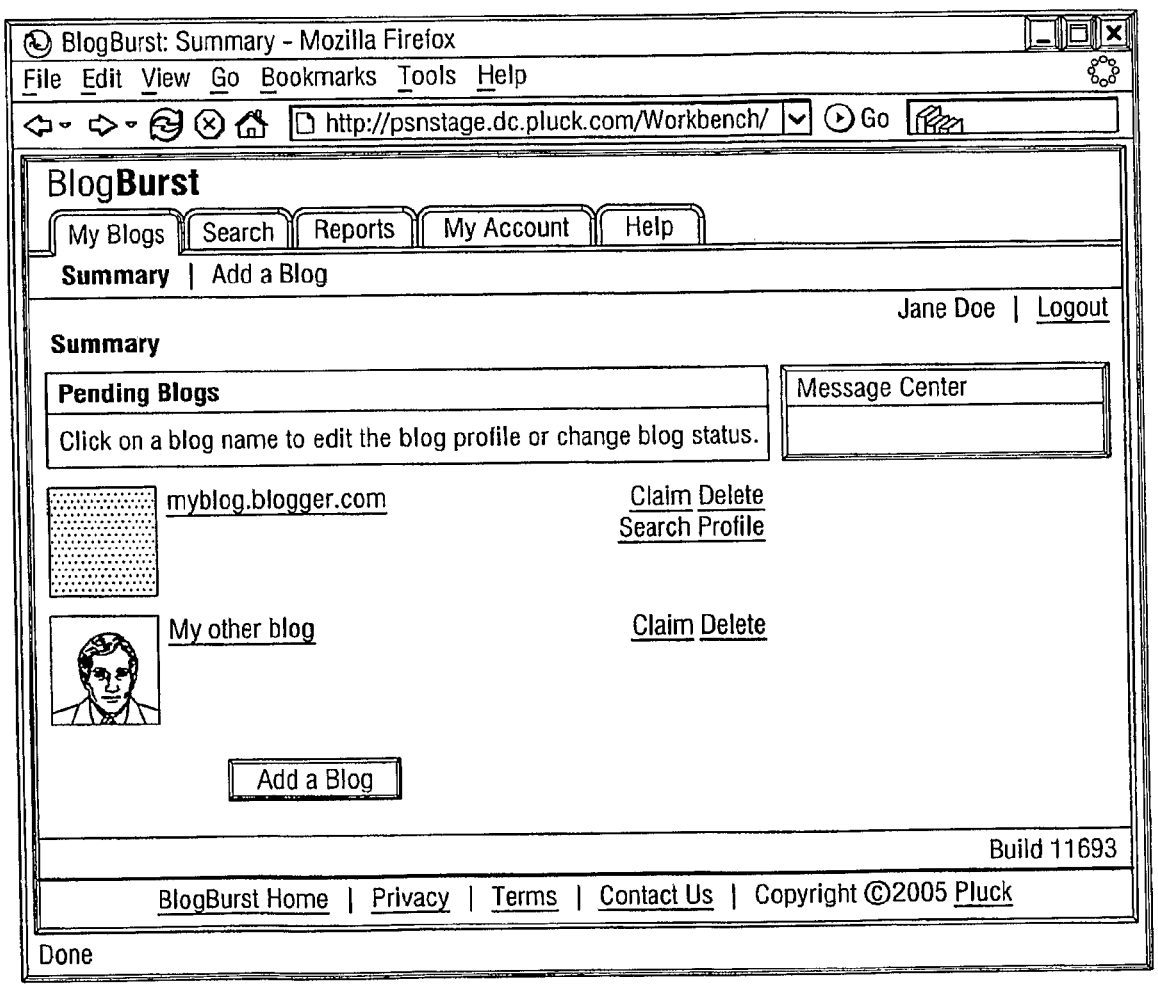
FIG. 3P is an illustration of a screen displayed by a display device of a representative first IHS of FIG. 1.
Figure 3Q:
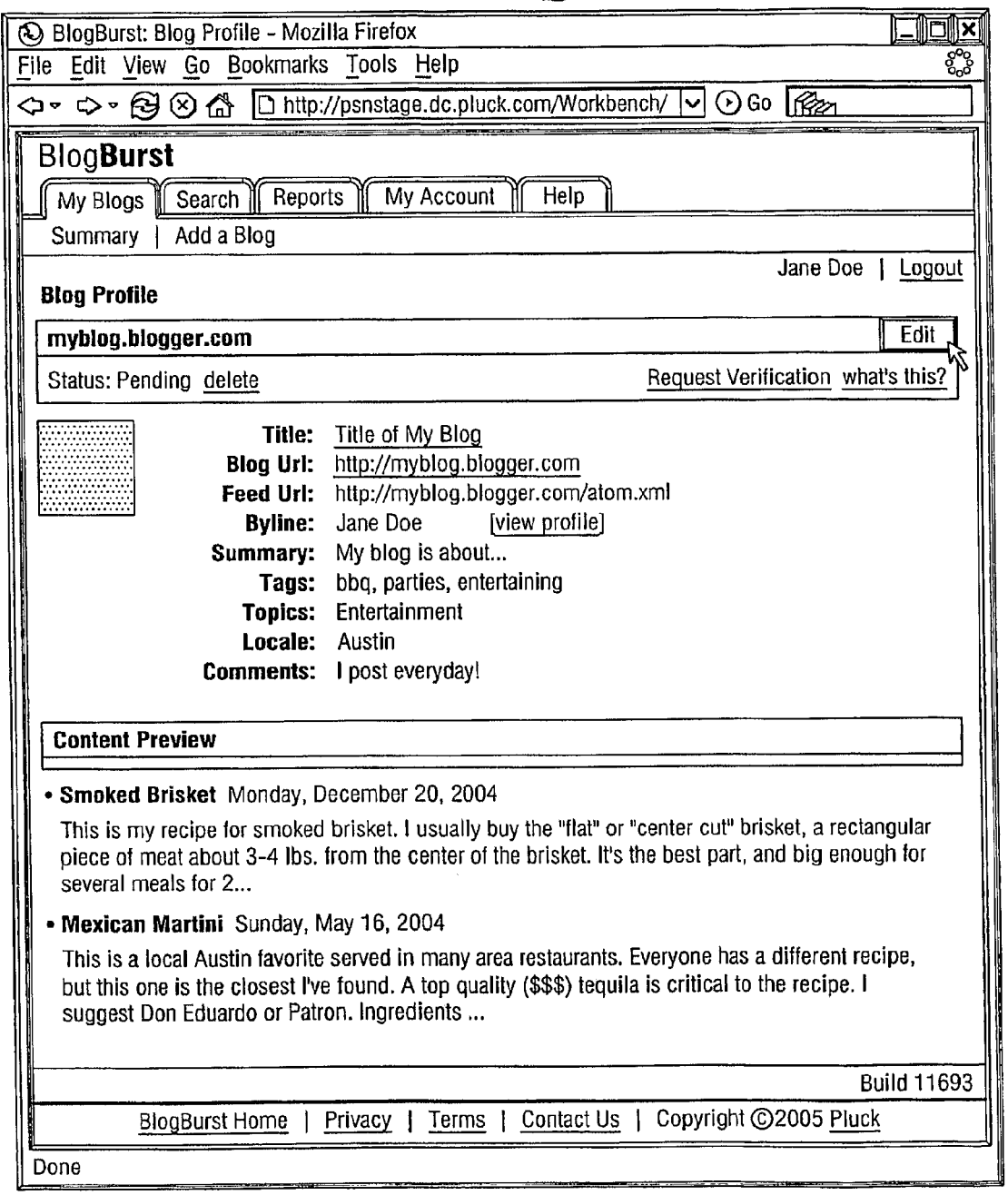
FIG. 3Q is an illustration of a screen displayed by a display device of a representative first IHS of FIG. 1.
Figure 3S:
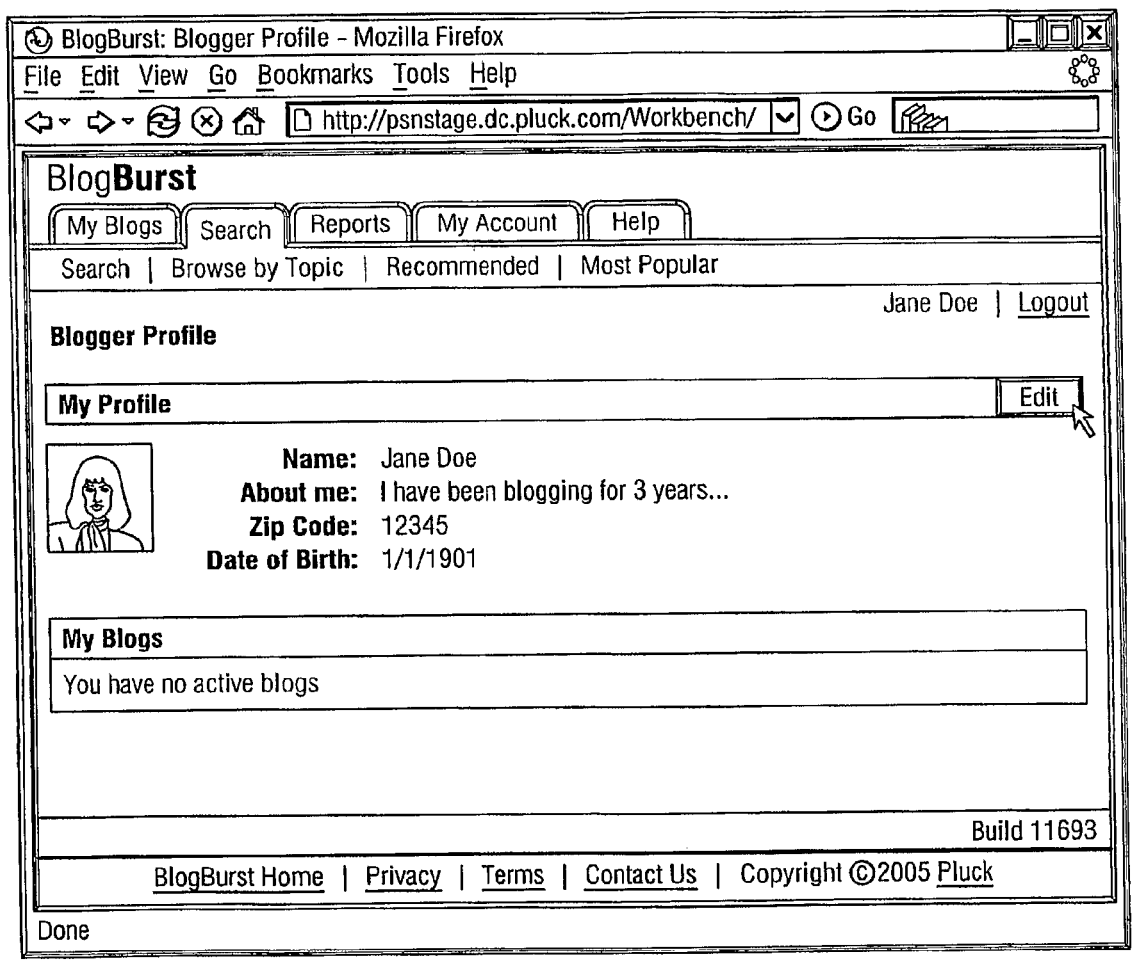
FIG. 3S is an illustration of a screen displayed by a display device of a representative first IHS of FIG. 1.

Next, the contributor is presented with a summary information status page (generated by the BlogBurst server), which displays a listing of content collections, their names and status (as shown in FIG. 3P). In response to the contributor's selection of a content collection (by clicking, in the screen of FIG. 3P, a link that is associated with the selected content collection), the BlogBurst server outputs (to the contributor's IHS) a specific profile view page (as shown in FIG. 3Q), which shows: (a) metadata about the selected content collection; and (b) a content preview of the most recently contributed content units in the content collection. In response to the contributor clicking (in the screen of FIG. 3Q)

an "Edit" button, the BlogBurst server enables the contributor to annotate and describe the content collection in more detail (as shown in FIG. 3R). In response to the contributor clicking (in the screen of FIG. 3R) a "Save" button, the BlogBurst server receives (via the network 120) and stores such annotative and descriptive information from the contributor's IHS, so that such information is available for subsequent display to the BlogBurst community's registered users (e.g., registered organizers and distributors) in the form of a profile view page (as shown in FIG. 3S). In response to the contributor clicking (in the screen of FIG. 3S) an "Edit" button, the BlogBurst server enables the contributor to edit its respective information via a profile-editing page (as shown in FIG. 3T). In response to the contributor clicking (in the screen on FIG. 3T) a "Save" button, the BlogBurst server receives (via the network 120) and stores such edited information from the contributor's IHS.

Moreover, via a web browsing program that is executed by a prospective contributor's IHS, the BlogBurst server enables the prospective contributor to: (a) access a web page at the BlogBurst server; (b) click a "Bloggers" tab (as shown in FIG. 3U); and (c) enter identification information to request a review of the prospective contributor's own content collection for possible invitation to join the BlogBurst community. In response to such request, the BlogBurst server performs the verification steps that are discussed further hereinabove. In response to such verification, the BlogBurst server alerts organizers to the prospective contributor's content collection, so that the organizers may determine whether to invite the prospective contributor to join the BlogBurst community.

Figure 4B:
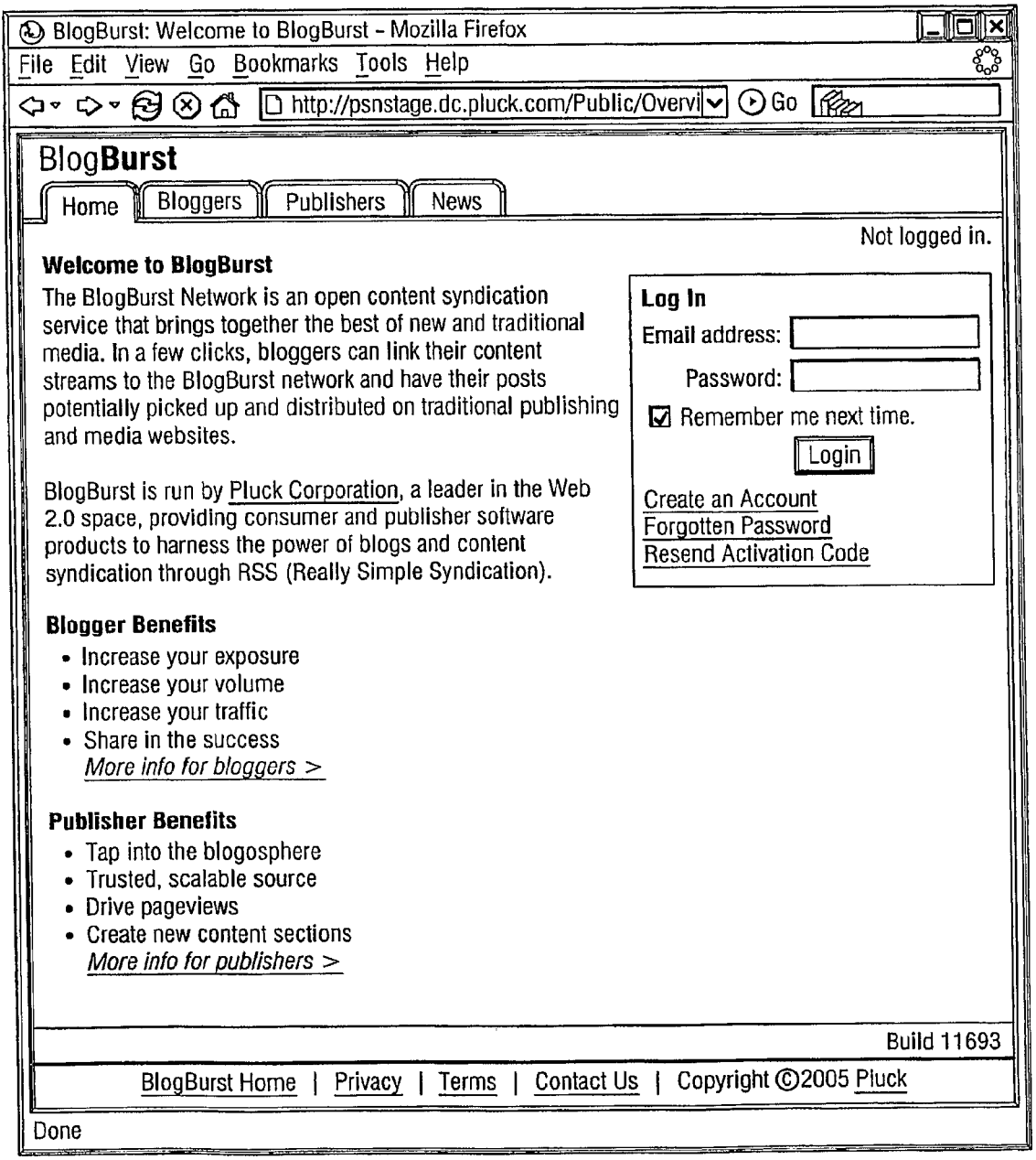
FIG. 4B is an illustration of a screen displayed by a display device of a representative third IHS of FIG. 1.
Figure 4C:
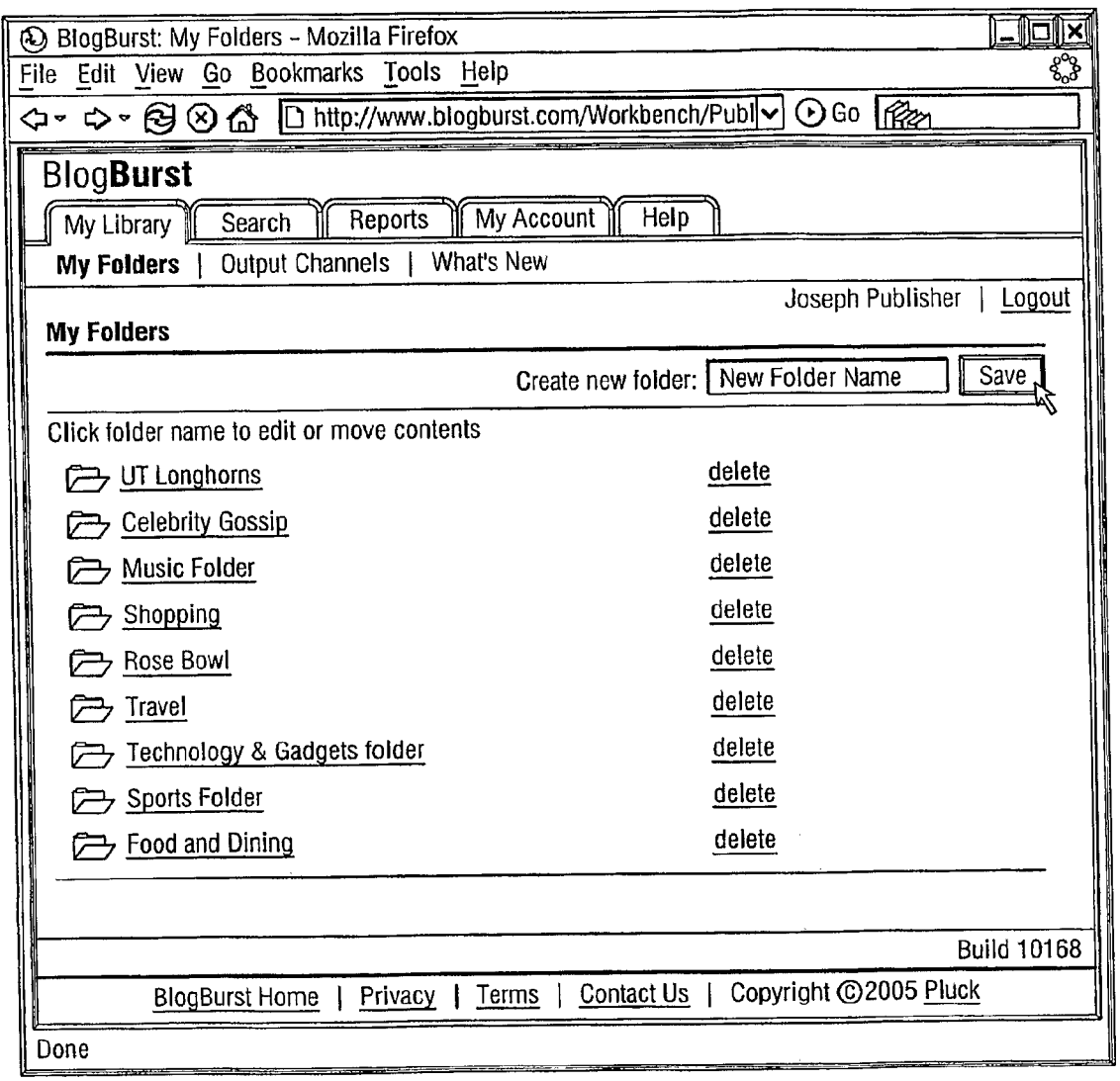
FIG. 4C is an illustration of a screen displayed by a display device of a representative third IHS of FIG. 1.
Figure 4D:
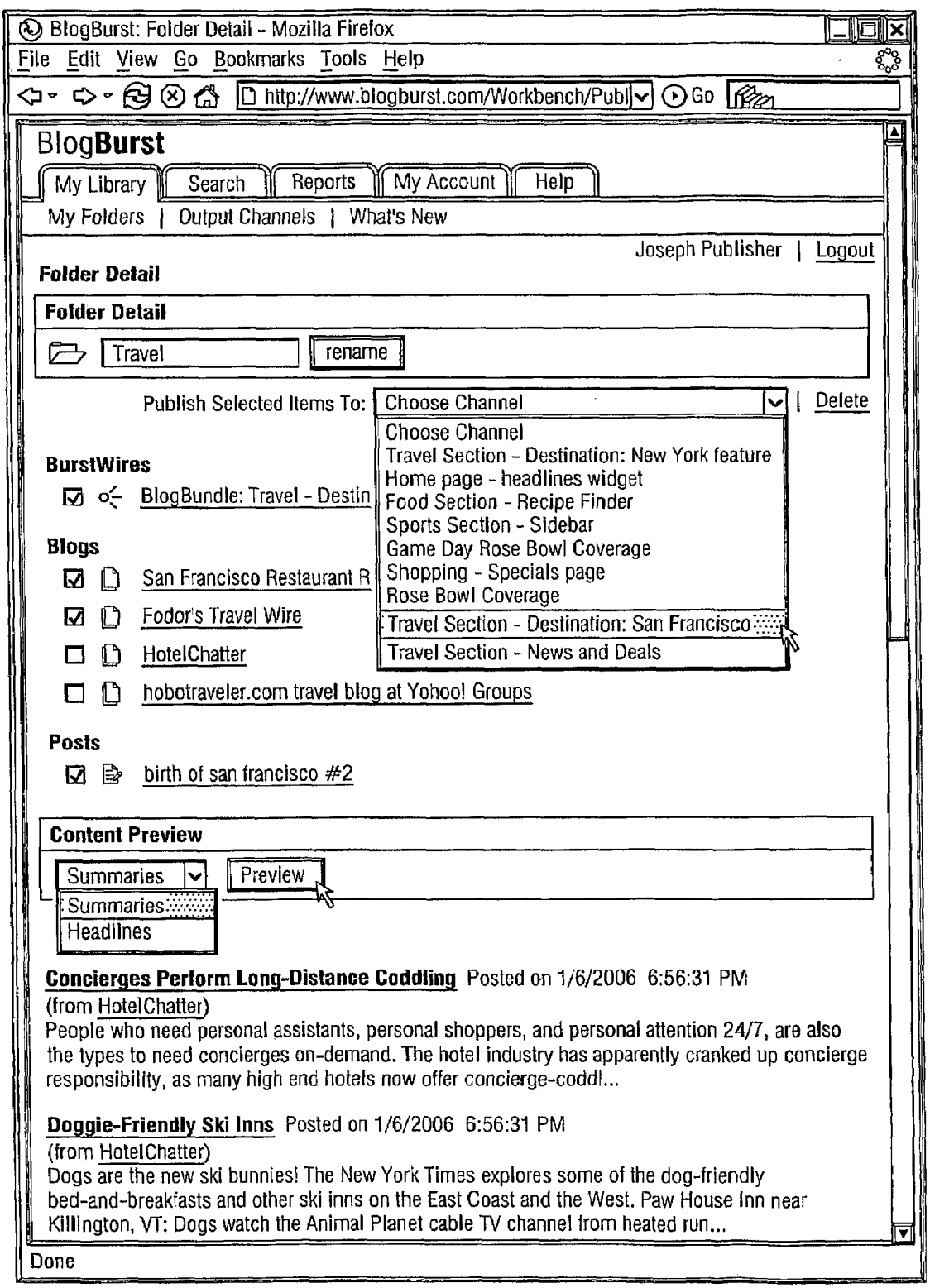
FIG. 4D is an illustration of a screen displayed by a display device of a representative third IHS of FIG. 1.
Figure 4E:
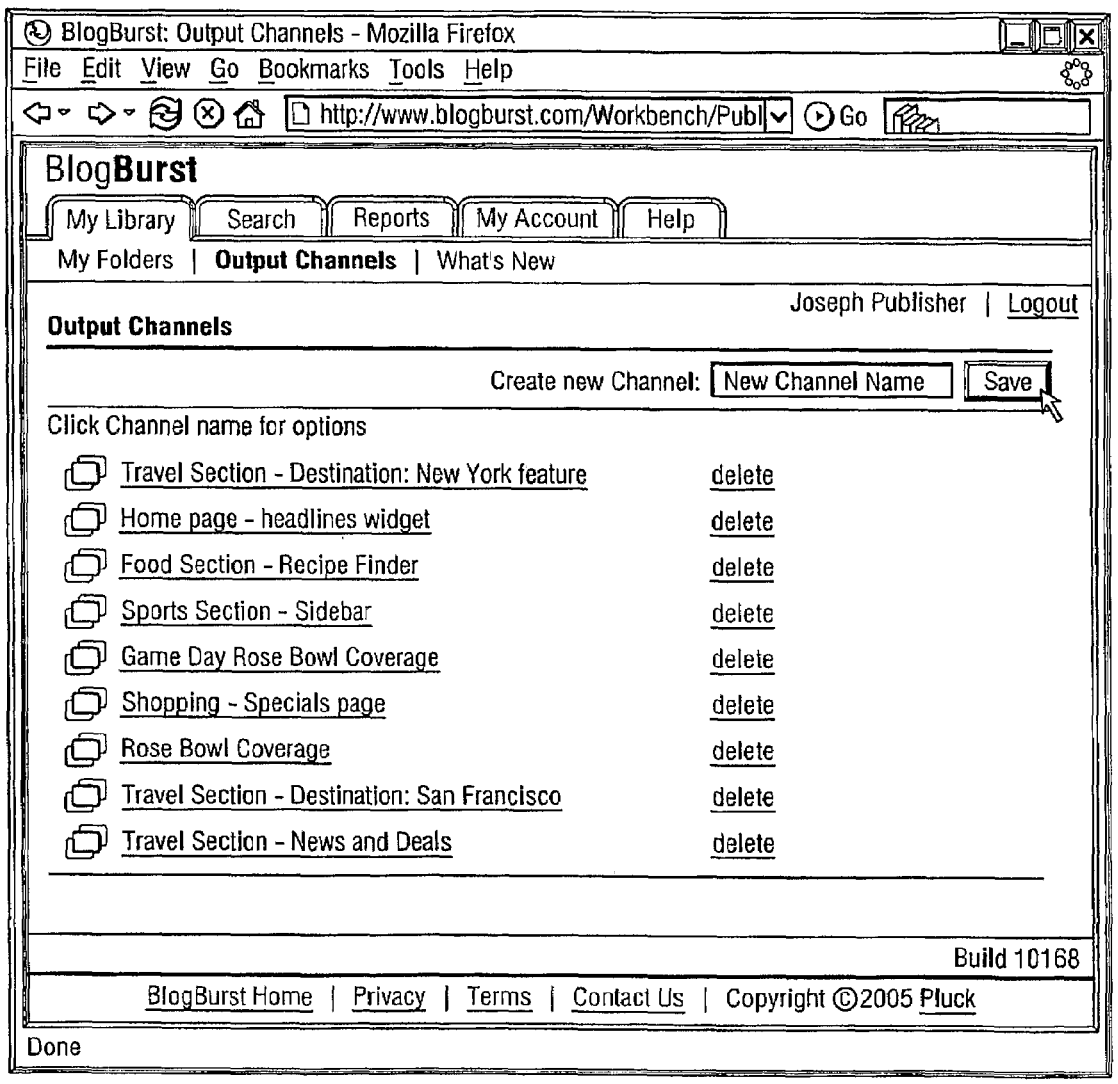
FIG. 4E is an illustration of a screen displayed by a display device of a representative third IHS of FIG. 1.
Figure 4G:
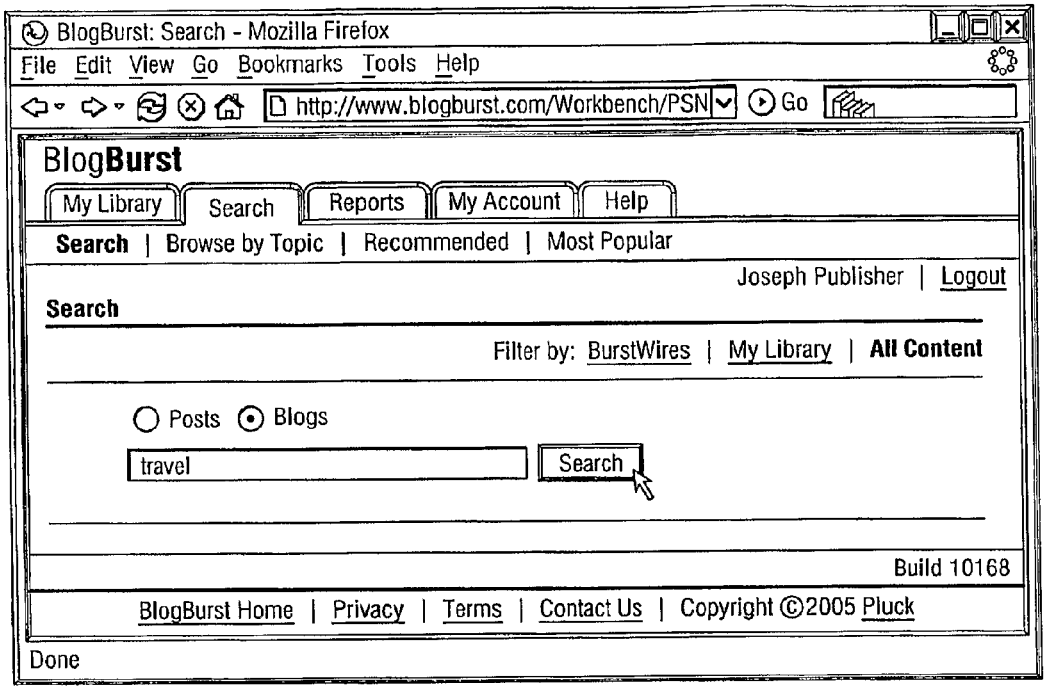
FIG. 4G is an illustration of a screen displayed by a display device of a representative third IHS of FIG. 1.
Figure 4I:
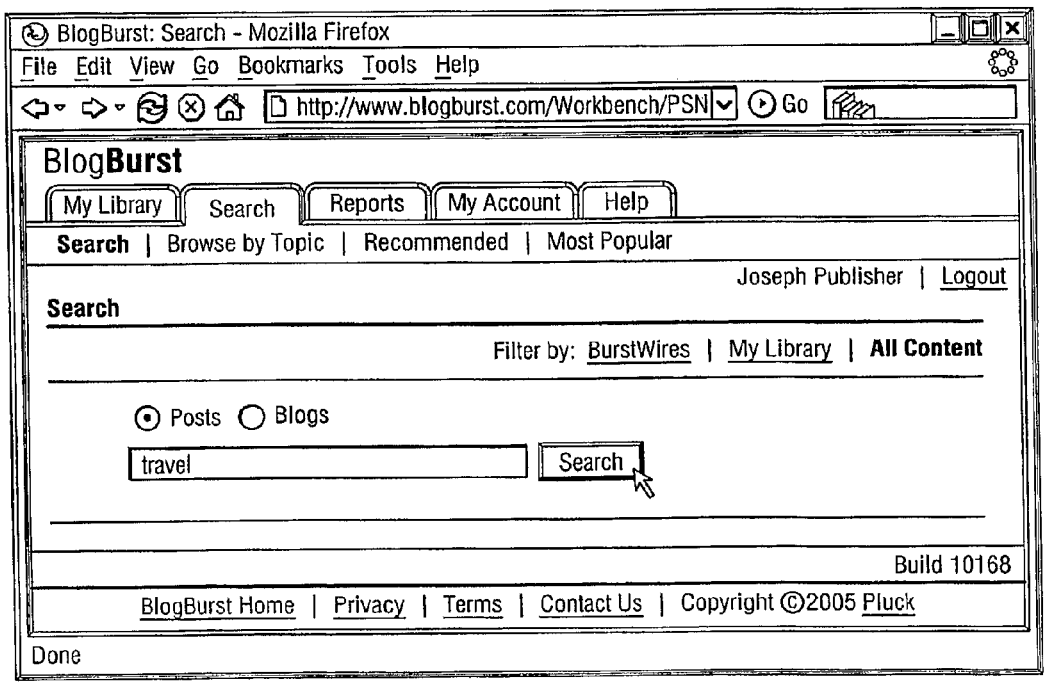
FIG. 4I is an illustration of a screen displayed by a display device of a representative third IHS of FIG. 1.
Figure 4H:
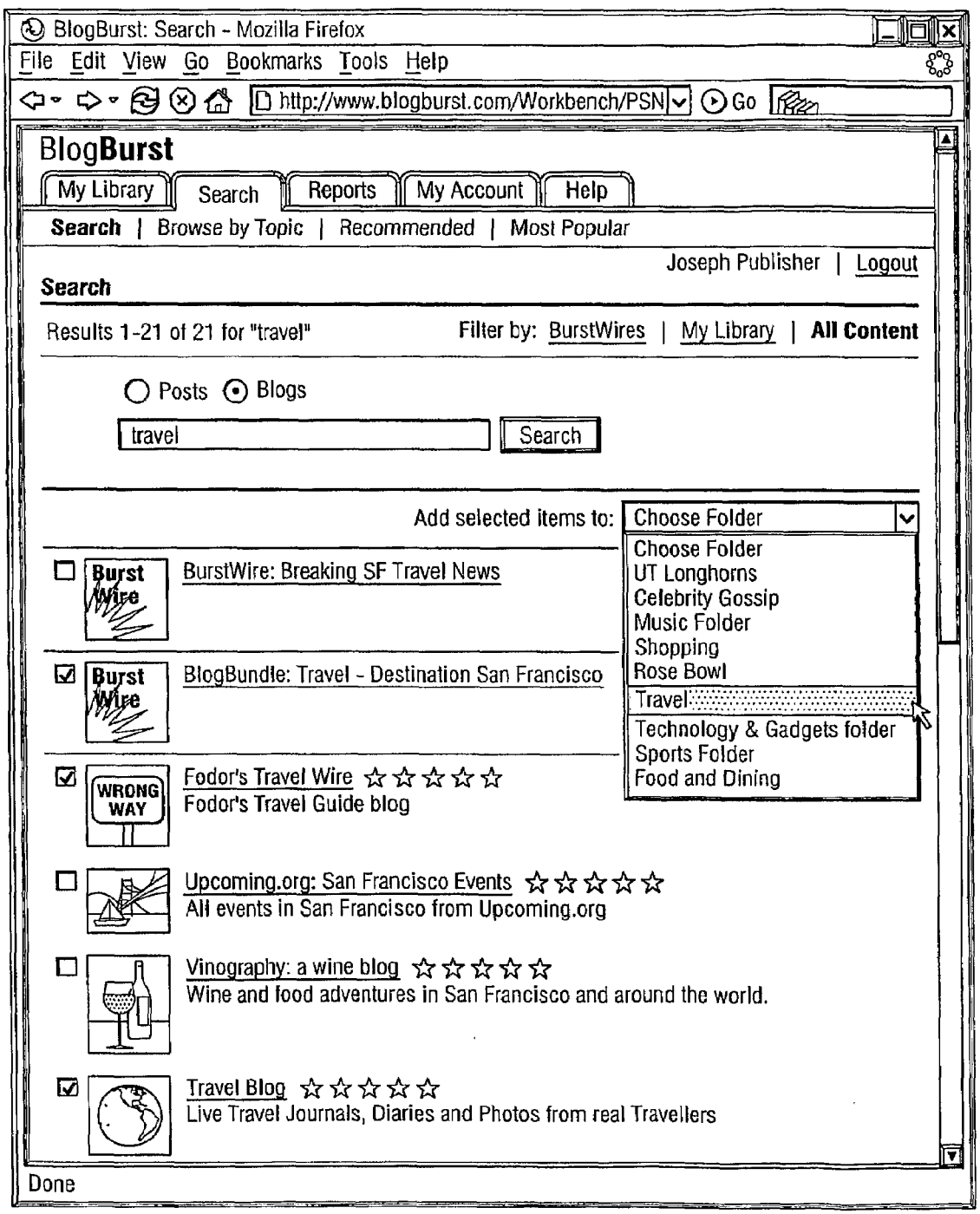
FIG. 4H is an illustration of a screen displayed by a display device of a representative third IHS of FIG. 1.
Figure 4N:
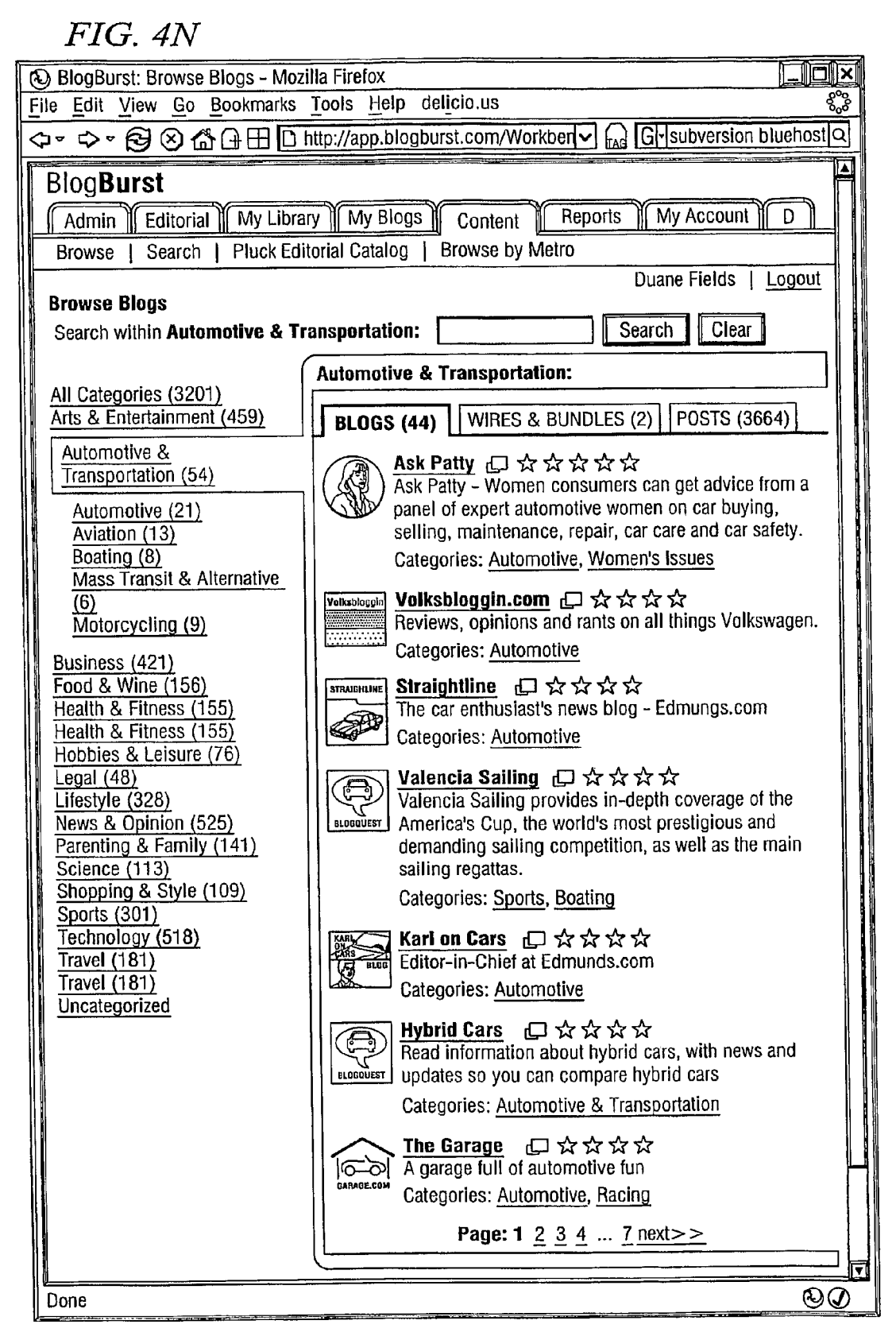
Figure 4P:
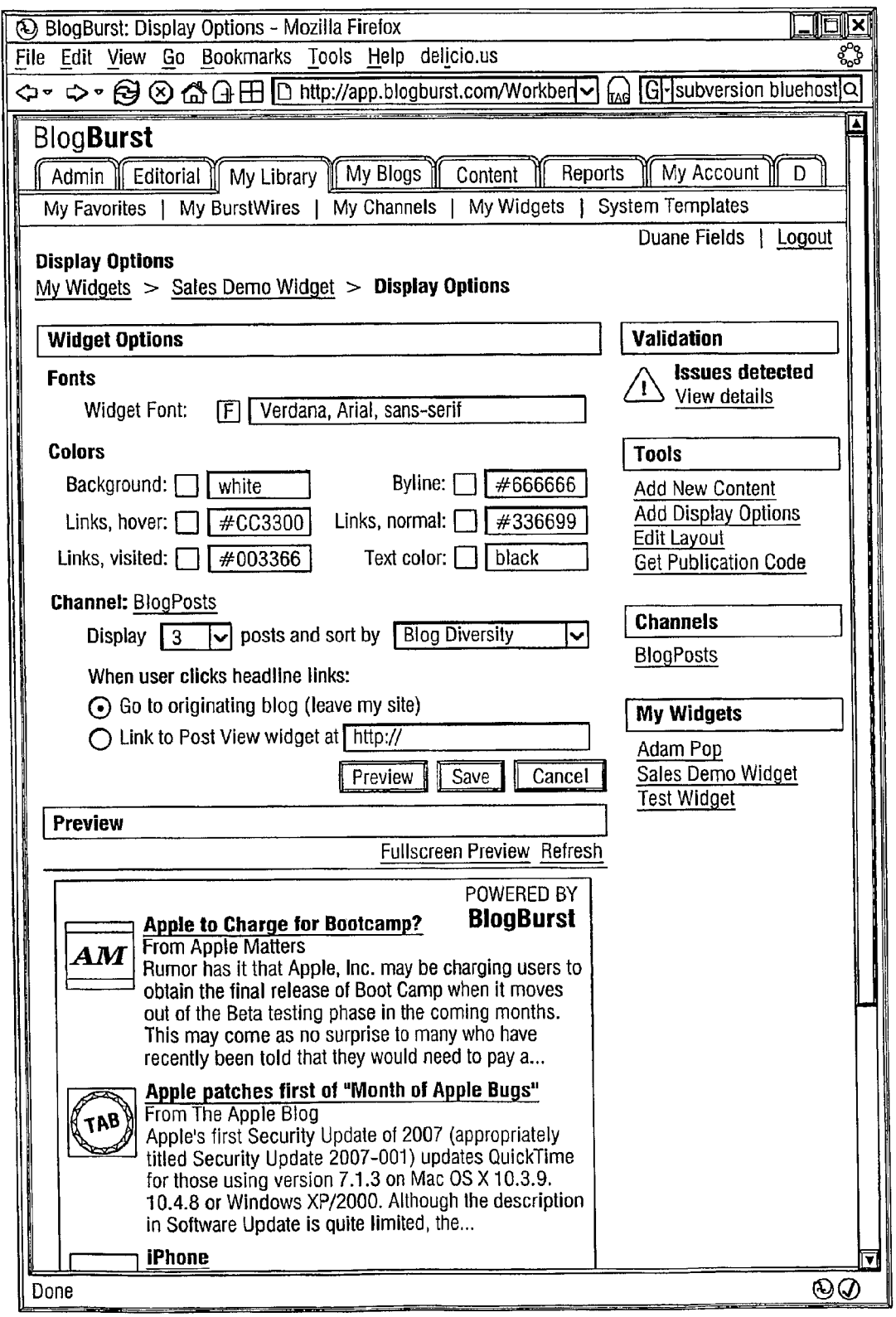
FIG. 4P is an illustration of a screen displayed by a display device of a representative third IHS of FIG. 1.
Figure 4Q:
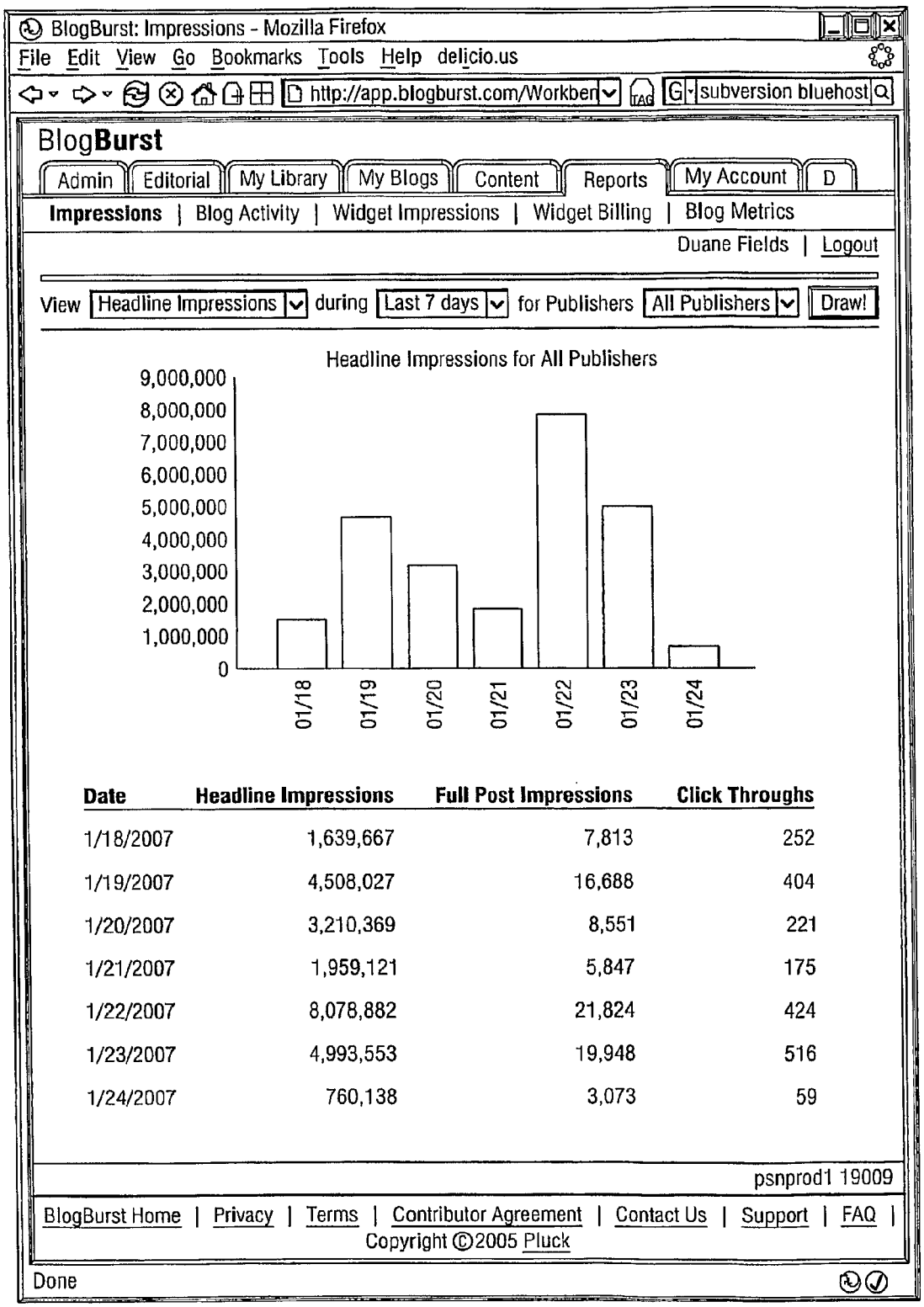
FIG. 4Q is an illustration of a screen displayed by a display device of a representative third IHS of FIG. 1.

FIGS. 4A-Q are illustrations of screens displayed by a display device of a representative third IHS ("distributor's IHS"), in response to signals that the distributor's IHS receives from the BlogBurst server via the network 120. The BlogBurst server provides system services and interfaces for "matchmaking" between contributors (and their individual content units) and distributors by operating as a content management system that supports licenses from such contributors (which are third party sources of such content). For example, using the organizer's IHS, the organizer enters an e-mail address of a selected distributor into a web-based form and causes the organizer's IHS to transmit the e-mail address to the BlogBurst server via the network 120. The BlogBurst server receives the e-mail address and, in response thereto, outputs an e-mail message to the distributor.

The e-mail message invites the distributor to join the BlogBurst community. The e-mail message invites the distributor to click a customized link that contains a system-generated unique ID invitation code. In response to the distributor clicking such link (which requests a web page from the BlogBurst server), the BlogBurst server (via such web page) prompts the distributor (via a web browsing program that is executed by the distributor's IHS) to voluntarily provide account registration information to the BlogBurst server via the network 120 (as shown in FIG. 4A), in order to join the BlogBurst community. In this manner, various distributors enter account settings and user information to describe themselves.

As shown in FIG. 4A, a distributor: (a) provides account setup and login information; and (b) accepts and agrees to a EULA between such distributor and the BlogBurst server's governing organization. The EULA specifies various obligations, access rights, distribution rights, and other rights that are automatically (under the EULA) imposed upon and granted to the BlogBurst community's registered users. Such obligations include specific activity limitations on the distributor, in which content units from various contributors are licensed to the distributor for republication on specified web pages of a specified web site, and not necessarily on: (a) other web pages; (b) other web sites; (c) e-mail message distributions; (d) other Internet transmission channels; or (e) print titles, except as otherwise designated within a master agreement between the distributor and the BlogBurst server's governing organization. In accordance with the EULA, such activities are performed and managed via controls and transformations, in response to the BlogBurst server's execution of a software program.

By suitably communicating (via the network 120) with a distributor's IHS, the BlogBurst server makes the registered contributors' content searchable by the distributor, accessible to the distributor, and redistributable by the distributor, as discussed further hereinbelow. For example, the BlogBurst server enables the distributor to: (a) group content by selecting among a broad pool of content collections submitted by multiple contributors (e.g., by selecting one or more content units, one or more content collections, and/or all available content, from one or more contributors); (b) select among predefined collections of contributor content ("BurstWires"), which are assembled by organizers; and (c) through a set of application programming interface ("API") services, redistribute such content (which is so selected by such distributor) to a specified web site of the distributor. Contents in the BlogBurst community (e.g., as such contents are stored by the BlogBurst server) are subject to the EULA, as explained above, which is agreed by the registered contributors.

Although the distributor selects such content from the registered contributors, such content is subject to uniform restrictions imposed upon the distributor with respect to distribution, author attribution, and modification. Accordingly, the BlogBurst server operates: (a) as an aggregator and repository for specifically licensed content from participating registered contributors; (b) as a broker of content, by facilitating a distributor's search, selection, use and other activity with the contributors' content; and (c) as an electronic agent for the contributors, by facilitating the distributor's direct searching and browsing of the contributors' (i) profiles, (ii) specific contributed content units, (iii) content description information, and (iv) contributor-supplied descriptive information about content units.

In response to account registration information from the user (e.g., the registered distributor), the BlogBurst server: (a) stores the user's account registration information; and (b) performs an additional e-mail address verification by asking for the user's reply to an additional e-mail message, similar to the manner discussed hereinabove (with respect to the registered contributor) in connection with FIGS. 3C and 3D. In response to a successful account registration, the BlogBurst server saves the account registration information and prompts the distributor to log into the BlogBurst server (as shown in FIG. 4B) and to save a browser cookie on the distributor's IHS for enabling automatic identification by the BlogBurst server on the distributor's subsequent visits from the same IHS. This process establishes a contractual relationship with the distributor for governing activity with content available (via the BlogBurst server) from contributors, as specified in the EULA and controlled by the BlogBurst server (which may be formed by multiple servers).

The BlogBurst server enables a distributor to create working folders for organizing the distributor's views of the content on the BlogBurst server. For example, after the distributor logs into the BlogBurst server (as shown in FIG. 4B), the distributor's IHS receives signals (representing the screen of FIG. 4C) from the BlogBurst server, and displays such screen to the distributor (e.g., in response to the distributor clicking a "My Library" tab, followed by clicking a "My Folders" tab).

As shown in FIG. 4C, if the distributor types a new working folder's name into a form and clicks a "Save" button, the BlogBurst server creates the working folder (having such name) for such distributor. Or, if the distributor clicks a "delete" hyperlink on the same line as an existing working folder's name, the BlogBurst server deletes such working folder (having such name) for such distributor. By comparison, in response to the distributor clicking an existing working folder's name (which is displayed as a hyperlink in FIG. 4C), the BlogBurst server outputs signals to the distributor's IHS, so that the distributor's IHS displays information (as shown in FIG. 4D) about such working folder to the distributor.

FIG. 4D shows a list of content (e.g., BurstWires, blogs, posts) that the distributor has associated with such working folder (e.g., "Travel" folder). As shown in FIG. 4D, the BlogBurst server enables the distributor to rename such working folder. Also, as shown in FIG. 4D, the BlogBurst server enables the distributor to preview such content, in either headline form or summary form. Accordingly, the BlogBurst server saves information for persistently associating such content with such working folder.

With reference to FIG. 4D, if the distributor wants to disassociate any part(s) of the listed content from such working folder, the distributor: (a) by checking one or more boxes adjacent to such part(s) of the listed content, selects such part(s) that the distributor wants to so disassociate; and (b) by clicking a "Delete" hyperlink, causes the BlogBurst server to perform such disassociation of such selected part(s).

As shown in FIG. 4D, if the distributor wants to publish all or part of the listed content on the distributor's web site (e.g., a news web site), the distributor: (a) by checking one or more boxes adjacent to the listed content, selects the content that the distributor wants to publish; and (b) by clicking a pull-down menu, selects a channel (e.g., section of the distributor's web site) to which the selected content will be published. In that manner, the BlogBurst server enables a distributor to select some or all content collections, reassembled content collections, and/or individual content units, as listed one or more working folders, to be published on a channel of the distributor's web site.

Or, if the distributor wants to review, modify or add such channels: (a) the distributor clicks an "Output Channels" tab in the screen of FIG. 4D; and (b) in response thereto, the BlogBurst server outputs signals to the distributor's IHS, so that the distributor views the screen of FIG. 4E.

As shown in FIG. 4E, if the distributor types a new channel's name into a form and clicks a "Save" button, the BlogBurst server creates the channel (having such name) for such distributor. Or, if the distributor clicks a "delete" hyperlink on the same line as an existing channel's name, the BlogBurst server deletes such channel (having such name) for such distributor. By comparison, in response to the distributor clicking an existing channel's name (which is displayed as a hyperlink in FIG. 4E), the BlogBurst server outputs signals to the distributor's IHS, so that the distributor's IHS displays information (as shown in FIG. 4F) about such channel to the distributor.

FIG. 4F shows a list of content (e.g., BurstWires, blogs, posts) that the distributor has associated with such channel (e.g., "Travel Section-Destination: San Francisco" section) of the distributor's web site, so that such listed content is published on such channel. As shown in FIG. 4F, the BlogBurst server enables the distributor to rename such channel and to modify such channel's alphanumeric identifier. Also, as shown in FIG. 4F, the BlogBurst server enables the distributor to preview such content, in either headline form or summary form. Accordingly, the BlogBurst server saves information for persistently associating such content with such channel.

With reference to FIG. 4F, if the distributor wants to disassociate any part(s) of the listed content from such channel of the distributor's web site, so that such listed content ceases being published on such channel, the distributor: (a) by checking one or more boxes adjacent to such part(s) of the listed content, selects such part(s) that the distributor wants to so disassociate; and (b) by clicking a "Delete" hyperlink, causes the BlogBurst server to perform such disassociation of such selected part(s).

If the distributor wants to search content: (a) the distributor clicks a "Search" tab in the screen of FIG. 4F; and (b) in response thereto, the BlogBurst server outputs signals to the distributor's IHS, so that the distributor views the screen of FIG. 4G. As discussed further hereinabove, registered contributors provide classification and descriptive information about themselves and their respective content collections. In the BlogBurst community, this meta information about the contributors and such content is searchable by the distributors. Accordingly, the BlogBurst server enables a distributor to search for content collections, BurstWires, and individual content units that match such distributor's specified criteria.

For example, as shown in FIG. 4G, the BlogBurst server enables a distributor to search for blogs that match such distributor's specified criteria (e.g., criteria specified as a search term "travel"). In response to the distributor clicking a "Search" button, the BlogBurst server performs the search and outputs signals to the distributor's IHS, so that the distributor views the screen of FIG. 4H.

FIG. 4H shows a list of blogs (and BurstWires that include such blogs) that match such distributor's specified criteria. Also, for each matching blog, FIG. 4H shows such blog's respective title, summary information, and BlogBurst community-wide rating average. As shown in FIG. 4H, if the distributor wants to add all or part of the listed content into a working folder, the distributor: (a) by checking one or more boxes adjacent to the listed content, selects the content that the distributor wants to so add; and (b) by clicking a pull-down menu, selects one of the distributor's working folders (e.g., "Travel") into which the selected content will be added by the BlogBurst server. In this manner, the BlogBurst server enables the distributor to identify and save content units that are consistent with the distributor's intended quality, stylistic and subject matter requirements.

Similarly, as shown in FIG. 4I, the BlogBurst server enables a distributor to search for posts that match such distributor's specified criteria (e.g., criteria specified as a search term "travel"). In response to the distributor clicking a "Search" button, the BlogBurst server performs the search and outputs signals to the distributor's IHS, so that the distributor views the screen of FIG. 4J.

FIG. 4J shows a list of posts (e.g., individual content units) that match such distributor's specified criteria. Also, for each matching post, FIG. 4J shows such post's respective title and preview information. As shown in FIG. 4J, if the distributor wants to add all or part of the listed content into a working folder, the distributor: (a) by checking one or more boxes adjacent to the listed content, selects the content that the distributor wants to so add; and (b) by clicking a pull-down menu, selects one of the distributor's working folders (e.g., "Travel") into which the selected content will be added by the BlogBurst server. In this manner, the BlogBurst server enables the distributor to identify and save content units that are consistent with the distributor's intended quality, stylistic and subject matter requirements.

Referring again to FIG. 4F, if the distributor wants to preview a channel (e.g., "Travel Section-Destination: San Francisco" section): (a) the distributor clicks a "Preview" button in the screen of FIG. 4F; and (b) in response thereto, the BlogBurst server outputs signals to the distributor's IHS, so that the distributor views the screen of FIG. 4K. FIG. 4K shows a facsimile of the channel's BlogBurst content in reverse chronological order.

As discussed hereinabove, the distributor benefits from the BlogBurst server's operation as a content delivery system for substantially real-time communication of content, according to the distributor's respective selection, filtering, and inclusion/exclusion of content units. In response to the distributor's selections of various content (e.g., blogs and/or posts), in the manner discussed hereinabove, the Blog Burst server and the distributor's IHS (and the server(s) that host(s) the distributor's web site(s)) communicate with one another (via the network 120) through a rich set of remote callable APIs, which automatically generate content for display on the distributor's web site(s) as agreed in the EULA between the distributor and the BlogBurst server's governing organization. For example, the distributor is able to copy client-side code (either created by hand or automatically generated by the BlogBurst server that uses the APIs) onto web pages of the distributor's web site(s). Also, the distributor is able to configure the server(s) that host(s) the distributor's web site(s), so that such server(s) automatically initiate(s) requests for manipulating such content on such server(s) before rendering such content on viewable rendered web pages of the distributor's web site(s).

In this manner, the BlogBurst server operates as a customized front-end cache of numerous distributor output channels. This cache is accessible by the distributor via a BlogBurst server-distributed API, as permitted under the EULA. Periodically (e.g., once per hour), the BlogBurst server incrementally updates content that is redistributed through the distributor's channels, in response to: (a) newly contributed content units from registered contributors; (b) the distributor's changes to its selections of content; and (c) automatic or organizer-managed changes to the distributor's selected BurstWires. The BlogBurst server formats and distributes content units, in a customized manner according to various requests on a distributor-by-distributor basis. For example, the BlogBurst server dynamically resizes content units and edits them for length, so that the distributor's web site displays such content units as headlines only (as shown in FIG. 4K), or as previewed excerpts (as shown in the alternative example channel preview screen of FIG. 4L), or as a whole (as shown in the alternative example channel preview screen of FIG. 4M), in a customized manner according to various requests on a distributor-by-distributor basis. Moreover, the BlogBurst server specifically styles content units in the XML formatting guidelines, in a customized manner according to various requests on a distributor-by-distributor basis (as shown in FIGS. 4K, 4L and 4M).

The BlogBurst server invites organizers and distributors to rate any content collection, content unit, or contributor on a 1 to 5 scale. In response to a user's rating of a collection, unit or contributor, the BlogBurst server stores the rating and presents a BlogBurst community-wide average associated with such collection, unit or contributor.

Changes to any of the BurstWires or custom syndication feeds are reflected in the BlogBurst server's operation as a front-end cache if needed and/or on a regular recurring basis, so that the latest version of the content collection is available to the distributor and reflected on viewable rendered web pages of the distributor's web site(s). With this changing-caching-refresh technique, the BlogBurst server enables a substantially real-time flow of re-renderable content for use by distributors on their web site(s). Accordingly, on a substantially continuous basis, the BlogBurst server applies updates by registered contributors, updates by organizers, and updates or revised filtering preferences by distributors, to the endpoint at which such content is accessed by the distributor and on viewable rendered web pages of the distributor's web site(s).

As discussed further hereinabove, the BlogBurst server enables the distributor to search for content that matches such distributor's search term(s). Also, the BlogBurst server enables the distributor to search for content according to categories that are assembled by organizers. If the distributor wants to search for content according to such categories, the distributor clicks a "Content" tab, followed by a "Browse" tab, which are shown in the screen of FIG. 4N. As shown in the left column of FIG. 4N, the BlogBurst server enables the distributor to: (a) review content in all categories; (b) review content in a particular category; and (c) review uncategorized content. As further shown in the left column of FIG. 4N, the BlogBurst server identifies (to the distributor): (a) a total count of blogs, BurstWires, other bundled content groups, and other content units in all categories; and (b) for each category, a total count of blogs, BurstWires, other bundled content groups, and other content units in such category.

For example, if the distributor wants to review content in a particular category (e.g., "Automotive & Transportation" category, which has fifty-four blogs, BurstWires, other bundled content groups, and other content units in the example of FIG. 4N): (a) the distributor selects the particular category by clicking the particular category's hyperlinked name in the left column of FIG. 4N; and (b) in response thereto, the BlogBurst server outputs signals to the distributor's IHS, so that the distributor views a list of such content in the right column of FIG. 4N.

In the right column of FIG. 4N, the distributor views a list of blogs (and their short descriptions) that exist within the particular category. Similarly, if the distributor wants to view a list of BurstWires and other bundled content groups (and their short descriptions) that exist within the particular category: (a) the distributor clicks a "Wires & Bundles" tab, and (b) in response thereto, the BlogBurst server outputs signals to the distributor's IHS, so that the distributor views such list. Or, if the distributor wants to view a complete list of all content units (and their previews) that exist within the particular category: (a) the distributor clicks a "Posts" tab; and (b) in response thereto, the BlogBurst server outputs signals to the distributor's IHS, so that the distributor views such list.

Further, as shown in FIG. 4N, the BlogBurst server enables a distributor to search within the particular category for content that matches such distributor's specified search terms. For example, in response to the distributor typing the search terms and clicking a "Search" button, the BlogBurst server performs the search and outputs signals to the distributor's IHS, so that the distributor views a list of content (within the particular category) that matches the distributor's specified search terms.

Moreover, in the left column, the distributor views a list of subcategories within the particular category, along with a total count of blogs, BurstWires, other bundled content groups, and other content units in each subcategory. Accordingly, if the distributor wants to review content in a particular subcategory (e.g., "Aviation" subcategory within the "Automotive & Transportation" category): (a) the distributor selects the particular subcategory by clicking the particular subcategory's hyperlinked name in the left column of FIG.

4N; and (b) in response thereto, the BlogBurst server outputs signals to the distributor's IHS, so that the distributor views a list of such content.

If the distributor wants to view a profile of a particular blog: (a) the distributor selects the particular blog by clicking the particular blog's hyperlinked name in the right column of FIG. 4N; and (b) in response thereto, the BlogBurst server outputs signals to the distributor's IHS, so that the distributor views the screen of FIG. 4O.

FIG. 4O shows such blog's respective title, uniform resource locators ("URLs"), short description, alphanumeric identifier, summary information, tags, categories (in which such blog has been categorized by organizers), and locale (if known). Also, FIG. 4O shows other comments (if any) about such blog, information about recent activity with such blog, and the BlogBurst community-wide rating average for such blog. If the distributor wants to rate such blog on a 1 to 5 scale, the distributor clicks a corresponding number of stars in the "New Rating" section at the top of FIG. 4O, and the BlogBurst server receives and uses such rating in calculating the BlogBurst community-wide rating average for such blog.

If the distributor wants to review a profile of the individual or entity that controls such blog: (a) the distributor click a "View Blogger Profile" hyperlink in FIG. 4O; and (b) in response thereto, the Blog Burst server outputs signals to the distributor's IHS, so that the distributor views such profile.

If the distributor wants to add such blog into a working folder, the distributor clicks an "Add to . . . " pull-down menu in FIG. 4O to select one of the distributor's working folders into which such blog will be added by the BlogBurst server.

For showing the recent activity with such blog, FIG. 4O shows: (a) date/time of the BlogBurst server's most recent attempted refresh (e.g., downloading) of such blog's content units from the server (e.g., server 108) that hosts such blog; and (b) date/time of the BlogBurst server's most recent successful refresh of such blog's content units from the server that hosts such blog. Also, FIG. 4O shows: (a) a total number of posts that exist within such blog; and (b) a chart that graphically illustrates a number of posts that were added to such blog per each of the most recent 30 days.

If the distributor wants to modify a manner in which content is displayed by a channel: (a) the distributor clicks a "My Library" tab, followed by a "My Widgets" tab, in the screen of FIG. 4P; and (b) in response thereto, the BlogBurst server outputs signals to the distributor's IHS, so that the distributor views a "Validation" section in the right column of FIG. 4P.

The "Validation" section shows a list of channels that have been created by the distributor (as discussed further hereinabove in connection with FIG. 4E). For modifying a manner in which content is displayed by a particular channel: (a) the distributor clicks the particular channel's hyperlinked name and an "Edit Display Options" hyperlink, in the "Validation" section; and (b) in response thereto, the BlogBurst server outputs signals to the distributor's IHS, so that the distributor views a "Display Options" section of FIG. 4P for the particular channel. Similarly, for modifying a layout (e.g., size and position within a window) of content that is displayed by a particular channel: (a) the distributor clicks the particular channel's hyperlinked name and an "Edit Layout" hyperlink, in the "Validation" section; and (b) in response thereto, the BlogBurst server outputs signals to the distributor's IHS, so that the distributor views a suitable screen for modifying such layout.

As shown in the "Display Options" section of FIG. 4P, the BlogBurst server enables the distributor to specify: (a) fonts and colors in which various types of content are displayed by the particular channel; (b) a number of posts that are displayed by the particular channel; (c) a manner of selecting such posts that are so displayed; and (d) action to be taken in response to a user clicking one of such posts that are so displayed (e.g., by the user clicking a displayed post's hyperlinked headline). By clicking a "Save" button, the distributor causes the BlogBurst server to save such specifications for the particular channel.

If the distributor wants to change the number of posts that are displayed by the particular channel, the distributor clicks a first pull-down menu in FIG. 4P to select a different number. If the distributor wants to change the manner of selecting such posts that are so displayed (e.g., sequence of such posts), the distributor clicks a second pull-down menu in FIG. 4P to select one of the following options for the particular channel: (a) "Blog Diversity," for selecting such posts in a rotating manner, so that posts are so displayed with equal priority; (b) "Most Recent," for selecting the most recent posts, which are to be so displayed; (c) "Popularity," for selecting the most frequently viewed posts, which are to be so displayed; and (d) "Editorial Rating," for selecting the highest rated posts, which are to be so displayed.

Further, as shown in FIG. 4P, if the distributor wants to change the action to be taken in response to a user clicking a displayed post's hyperlinked headline, the distributor clicks a suitable one of the following options for the particular channel: (a) "Go to originating blog," so that such action includes displaying (e.g., to such user via a web browsing program that is executed by such user's IHS) the web site of the blog that contains such post; and (b) "Link to Post View widget at," so that such action includes displaying (e.g., to such user via a web browsing program that is executed by such user's IHS) a distributor-specified web page that downloads such post (e.g., downloads such post from the BlogBurst server or, alternatively, from the web site of the blog that contains such post). Such downloading (by the distributor-specified web page) occurs: (a) in a first example, automatically in response to such user clicking the displayed post's hyperlinked headline; and (b) in a second example, periodically (e.g., once per hour), in a manner independent of such user clicking the displayed post's hyperlinked headline.

In one implementation, the distributor-specified web page is part of the distributor's web site(s). In another implementation, the distributor-specified web page is part of a web site that is hosted by the BlogBurst server, in which case the BlogBurst server outputs such post for display to such user (e.g., via a web browsing program that is executed by such user's IHS), in a manner that complies with the distributor's specified layout and display options.

In response to the distributor clicking a "Preview" button, the BlogBurst server outputs signals to the distributor's IHS, so that the distributor views a "Preview" section of FIG. 4P for the particular channel. By clicking a "Refresh" hyperlink, the distributor causes the BlogBurst server to refresh (e.g., update) such preview. By clicking a "Fullscreen Preview" hyperlink, the distributor causes the BlogBurst server to refresh (e.g., update) such preview in a fullscreen view.

The BlogBurst server records: (a) a number of times that a content unit's headline is viewed ("headline impressions"); (b) a number of times that a content unit's full content is viewed ("full post impressions"); and (c) a number of times that a content unit's embedded hyperlink is clicked by a user for navigation to another web site ("click throughs"), such as for navigation to an advertiser's web site. The BlogBurst server reports such information to the contributor of such content unit, in a manner that supports accounting of financial compensation (if any): (a) due (from distributors and/or the BlogBurst server's governing organization) to the contributor as consideration for such viewing; and/or (b) owed (to distributors and/or the BlogBurst server's governing organization) by the contributor as consideration for such viewing.

If the distributor wants to review a number of headline impressions, full post impressions, and click throughs that occurred aggregately via all distributors' web site(s): (a) the distributor clicks a "Reports" tab, followed by an "Impressions" tab, in the screen of FIG. 4Q; and (b) in response thereto, the BlogBurst server outputs signals to the distributor's IHS, so that the distributor views a "Headline Impressions for All Publishers" section of FIG. 4Q.

This section of FIG. 4Q shows a chart that graphically illustrates a number of headline impressions that occurred aggregately via all distributors' web site(s) per each of the most recent 7 days. As shown in FIG. 4Q, the BlogBurst server enables the distributor to operate a first pull-down menu for selecting whether such chart illustrates a number of full post impressions or a number of click throughs (e.g., instead of a number of headline impressions). Also, this section of FIG. 4Q shows a table that lists a number of headline impressions, full post impressions, and click throughs that occurred aggregately via all distributors' web site(s) per each of the most recent 7 days.

As shown in FIG. 4Q, the BlogBurst server enables the distributor to operate: (a) a second pull-down menu for specifying a different period of time (e.g., instead of the most recent 7 days); and (b) a third pull-down menu for reviewing a number of headline impressions, full post impressions, and click throughs that occurred via the distributor's web site(s) (e.g., instead of aggregately via all distributors' web site(s)). Accordingly, the BlogBurst server records such numbers (of headline impressions, full post impressions, and click throughs) on a distributor-by-distributor basis, in a manner that supports accounting of financial compensation (if any): (a) owed (to contributors and/or the BlogBurst server's governing organization) by the distributor as consideration for such viewing; and/or (b) due (from contributors and/or the BlogBurst server's governing organization) to the distributor as consideration for such viewing.

Figure 5A:
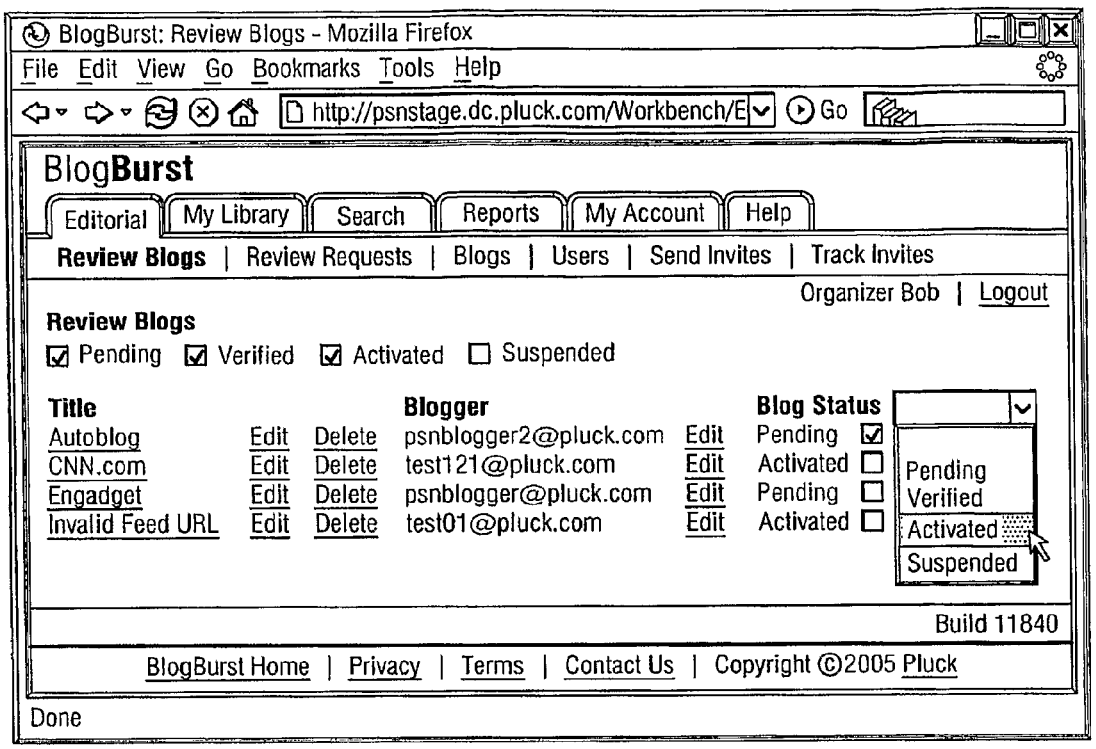
FIG. 5A is an illustration of a screen displayed by a display device of a representative second IHS of FIG. 1.

FIGS. 5A-N are illustrations of screens displayed by a display device of an organizer's IHS, in response to signals that the organizers IHS receives from the BlogBurst server via the network 120. Organizers include staff members and other designees of the BlogBurst server's governing organization. The organizers select and recruit contributors, review content units, and repackage content collections and content units into reassembled content collections. The organizers are responsible for managing the BlogBurst server's receipt and storage of content, consistent with such organization's policies and editorial standards of quality and topic relevance.

Moreover, the BlogBurst server executes software for automatically: (a) detecting content units that have errors, incomplete content, inefficient coding, potentially harmful coding, and/or offensive wording; and (b) in response thereto, revising or blocking such detected content units, so that content units are more efficiently redistributable by distributors. For example, the BlogBurst server executes software for automatically normalizing HTML of content units, such as by: (a) balancing tags; (b) imposing well-formed structures; and (c) converting relative links and images to absolute links and images. Also, the BlogBurst server executes such software for automatically removing (from content units) potentially harmful coding, such as certain types of script tags, event handlers, embedded code (flash, applets), and cascading style sheet references and settings. Moreover, the BlogBurst server executes such software for automatically reducing images (within content units) to a maximum width of 350 pixels.

After a contributor has submitted its aggregate content collection or individual content unit, yet before the BlogBurst server allows a distributor to search and select such contributor's content, the collection has a status of "pending." As shown in FIG. 5A, in response to an organizer clicking a link to review content, the BlogBurst server outputs a linked list of content collections, organized by status. The BlogBurst server enables an organizer to change any content collection's status to be activated, verified or suspended (as shown in FIG. 5A).

In response to a content collection's status being activated, the Blog Burst server enables distributors to view and select the content collection and its subordinate content units, so that distributors are enabled to select such content for addition to working folders and output channels, as discussed further hereinabove. The BlogBurst server tracks the status of content units in the BlogBurst community throughout the content creation, content organization and content distribution process.

Figure 5B:
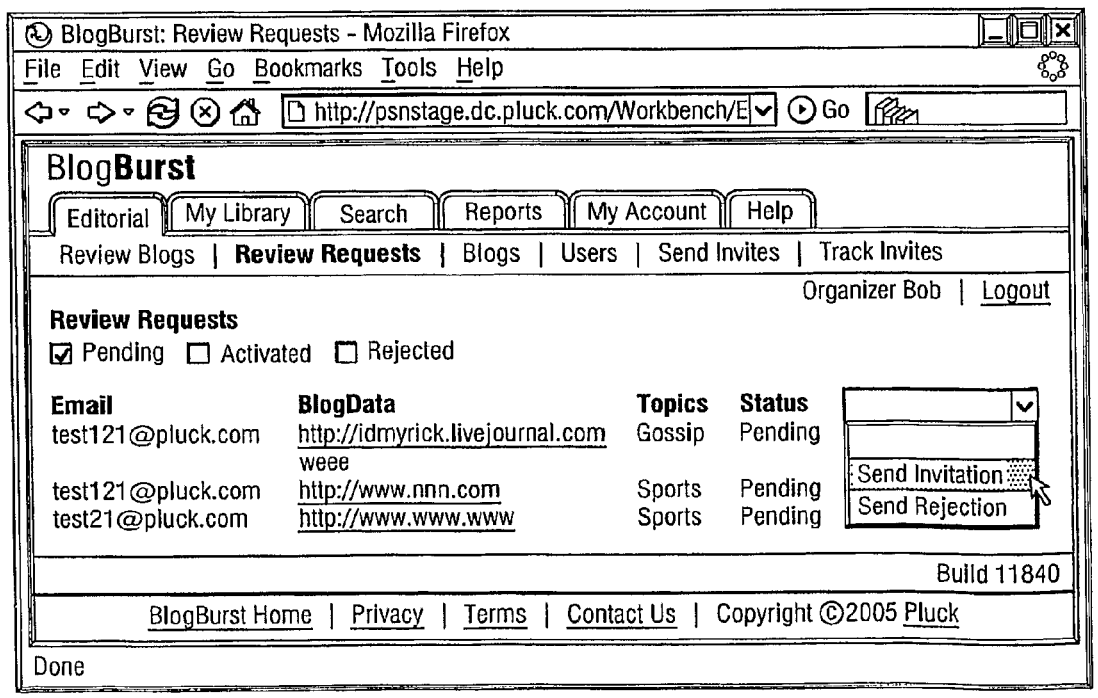
FIG. 5B is an illustration of a screen displayed by a display device of a representative second IHS of FIG. 1.

If prospective contributors want to join the BlogBurst community, the BlogBurst server enables them to request, via web-based form, an invitation from the BlogBurst server. As shown in FIG. 5B, the BlogBurst server displays a list of such requests, for viewing by organizers. The BlogBurst server enables an organizer to check prospective contributors' respective content collections and decide whether to reject or accept a prospective contributor's request for an invitation. In response to acceptance or rejection of an invitation request, the BlogBurst server sends an electronic mail ("e-mail") message to the prospective contributor, informing it of the acceptance or rejection decision. If the request is accepted, the e-mail message contains an invitation code and account registration instructions (as shown in FIG. 3A).

Figure 5C:
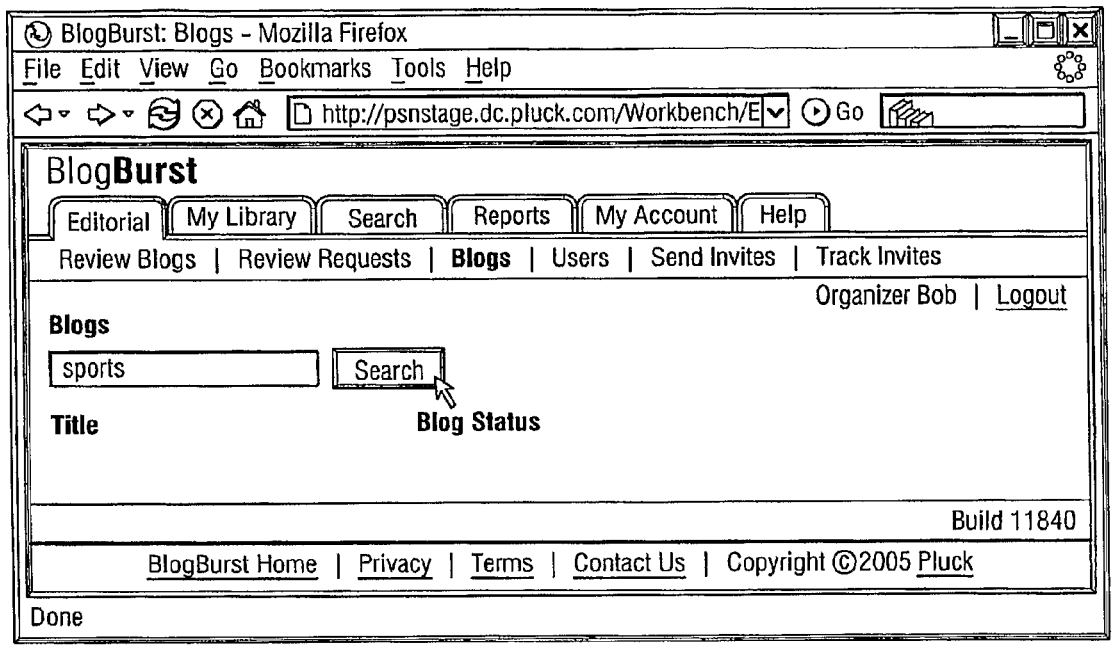
FIG. 5C is an illustration of a screen displayed by a display device of a representative second IHS of FIG. 1.
Figure 5E:
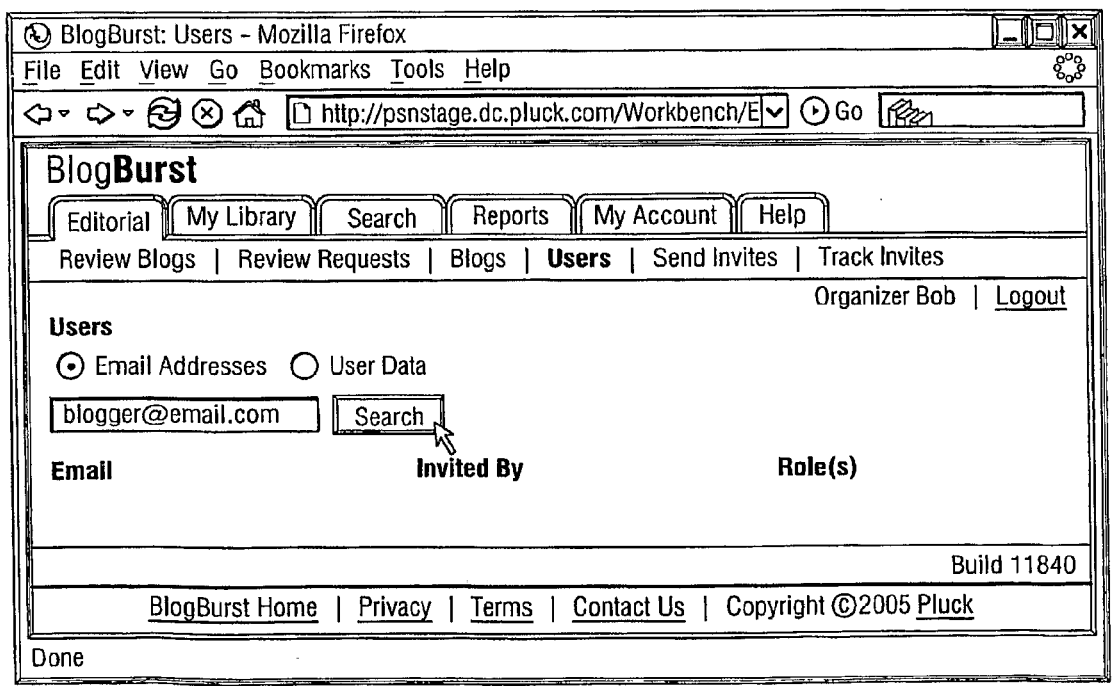
FIG. 5E is an illustration of a screen displayed by a display device of a representative second IHS of FIG. 1.
Figure 5D:
FIG. 5D is an illustration of a screen displayed by a display device of a representative second IHS of FIG. 1.
Figure 5F:
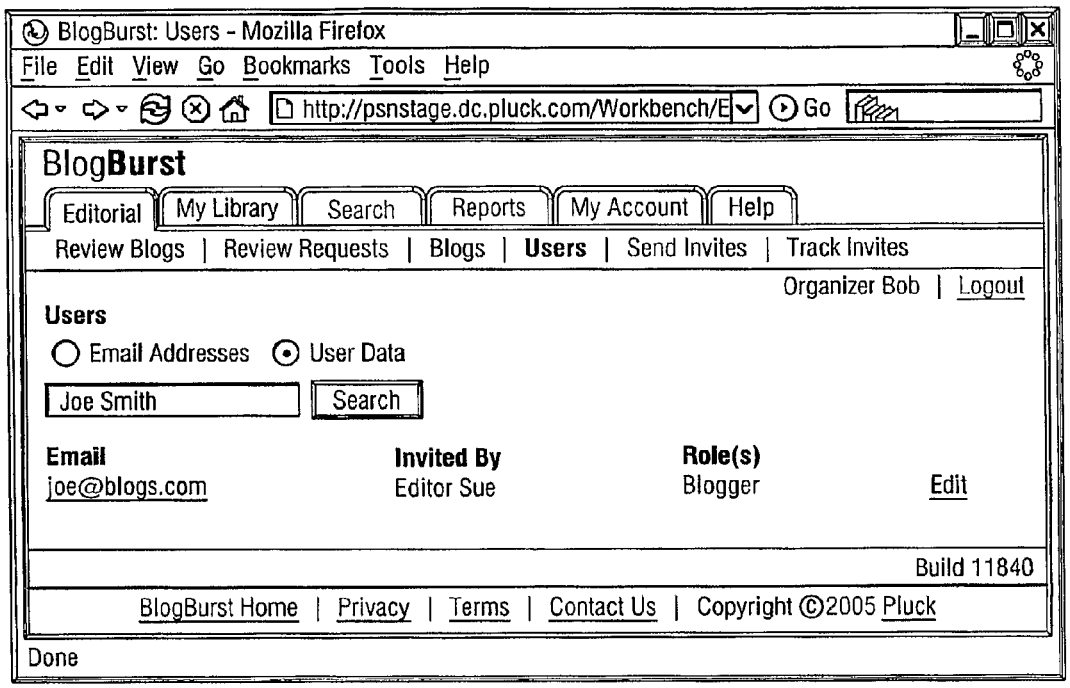
FIG. 5F is an illustration of a screen displayed by a display device of a representative second IHS of FIG. 1.
Figure 5H:
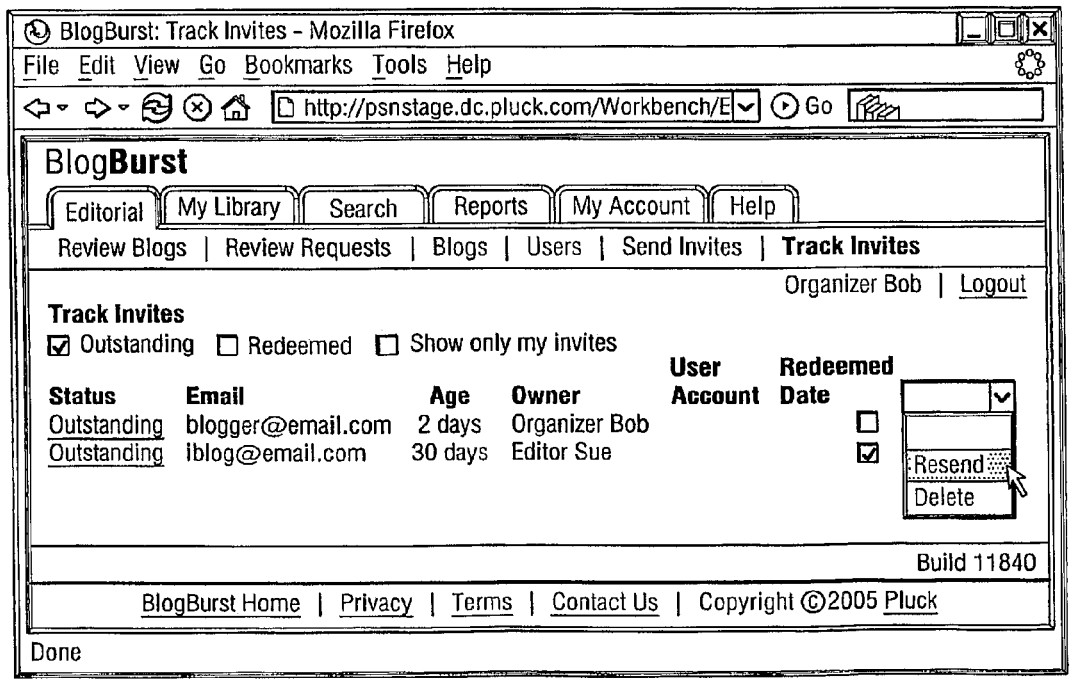
FIG. 5H is an illustration of a screen displayed by a display device of a representative second IHS of FIG. 1.
Figure 5G:
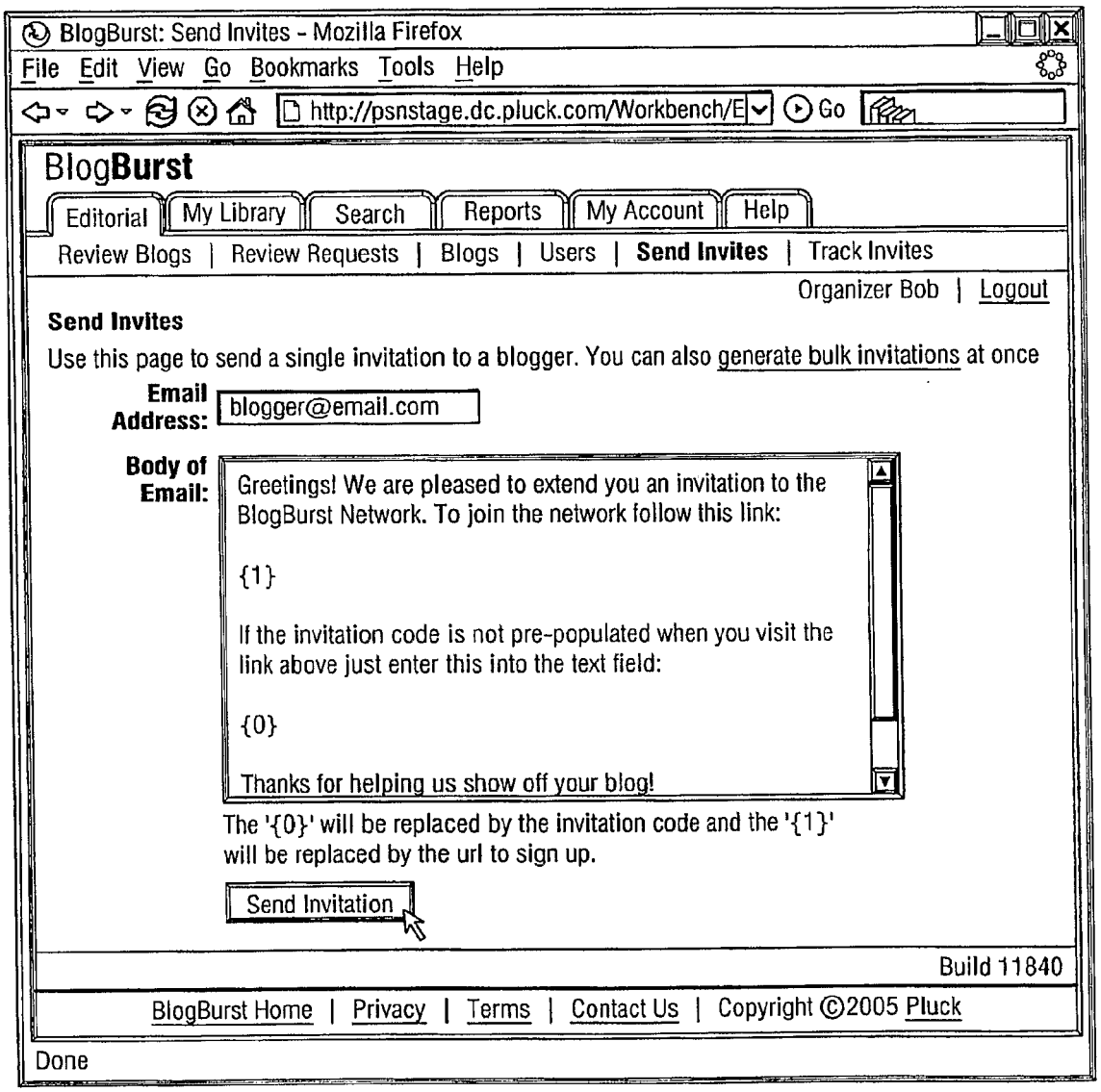
FIG. 5G is an illustration of a screen displayed by a display device of a representative second IHS of FIG. 1.

The BlogBurst server enables an organizer: (a) to search content units via a search interface (as shown in FIG. 5C), and to view search results, which are selectable for addition to working folders (as shown in FIG. 5D); (b) to search contributor information, according to e-mail address or other user data (e.g., name) via a search interface (as shown in FIG. 5E), and to view search results, which are selectable for editing (as shown in FIG. 5F); (c) to invite contributors to join the BlogBurst community (as shown in FIG. 5G); and (d) to track such invitations, which are updated by the BlogBurst server (as shown in FIG. 5H).

The BlogBurst server enables an organizer (via a web browsing program that is executed by the organizer's IHS) to view any content collection and to add or change descriptive and annotative information about the content collection (as shown in FIG. 5I). In response to these additions and changes, the BlogBurst server reflects the latest descriptive and metadata information about the content collections, in order to accurately support distributors that search and browse the content collections.

Figure 5J:
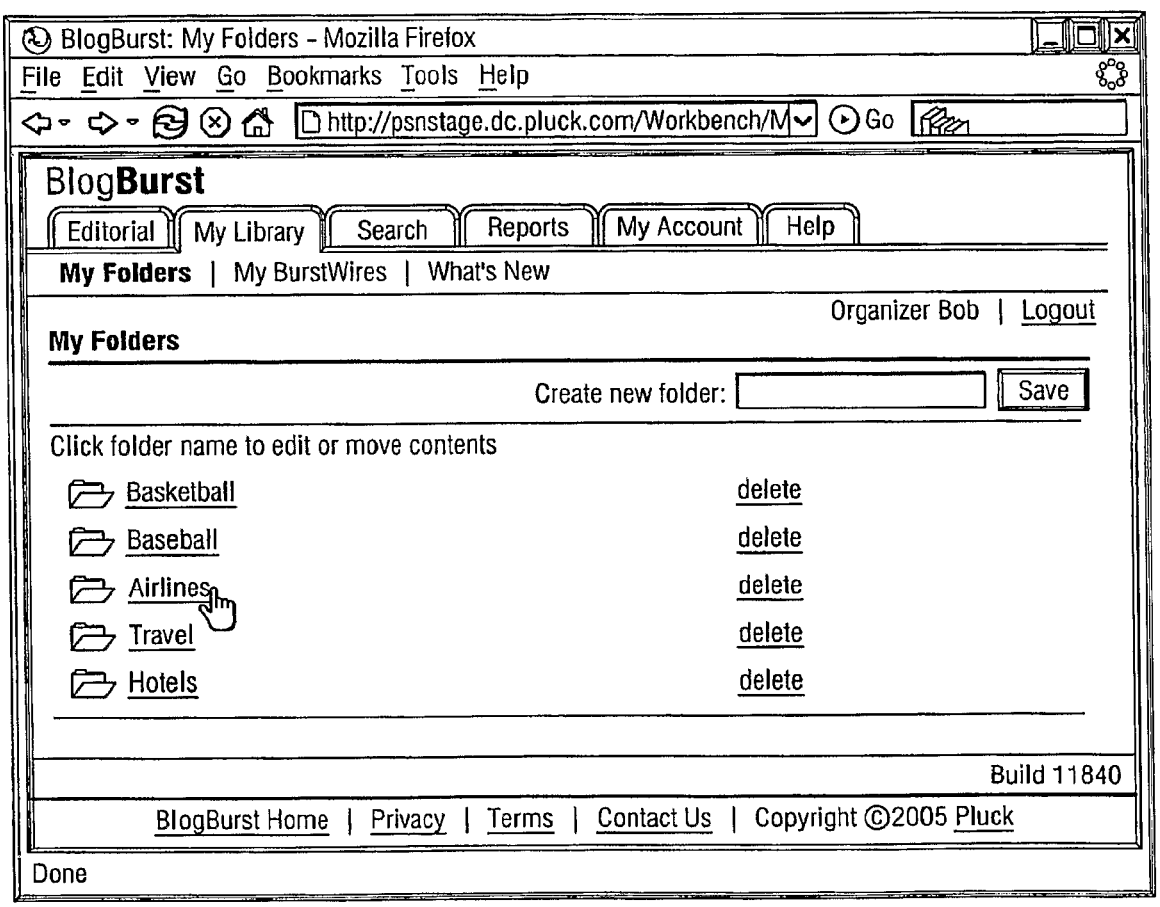
FIG. 5J is an illustration of a screen displayed by a display device of a representative second IHS of FIG. 1.

As shown in FIG. 5J, the BlogBurst server enables organizers to create and manage working folders, similar to the manner discussed further hereinabove in connection with FIGS. 4C, 4D, 4H and 4J.

Figure 5K:
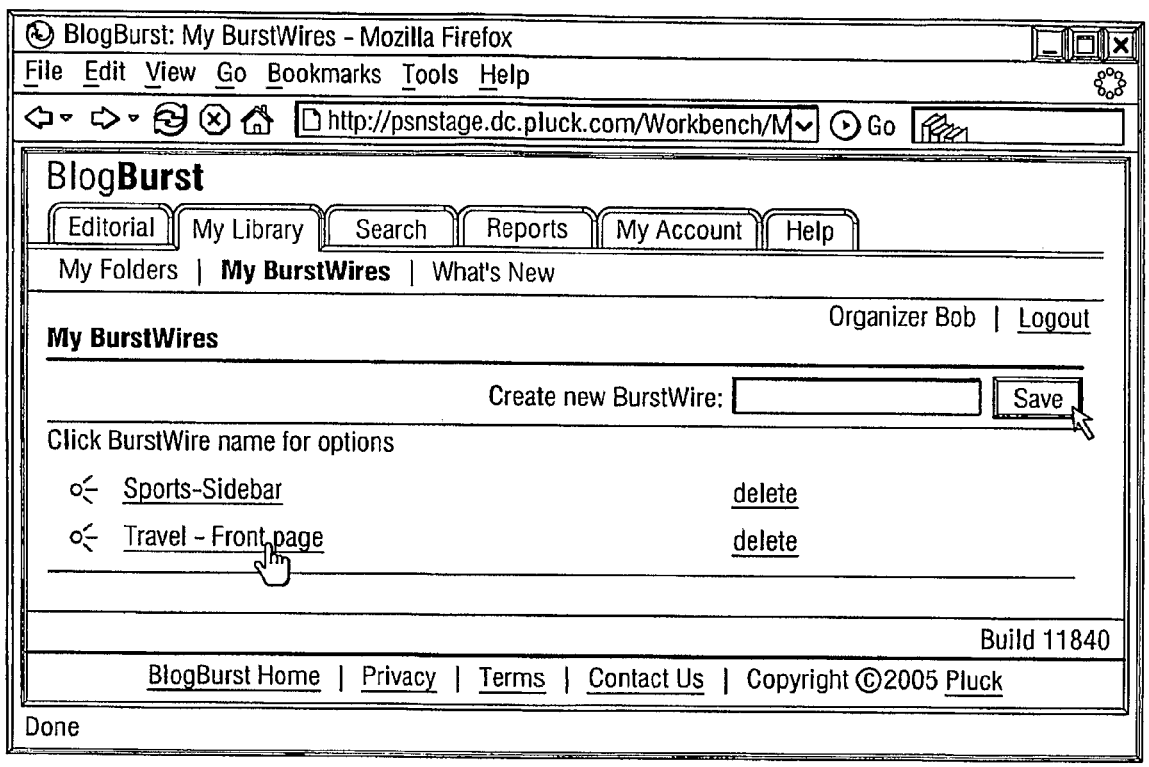
FIG. 5K is an illustration of a screen displayed by a display device of a representative second IHS of FIG. 1.

Moreover, as shown in FIG. 5K, the BlogBurst server enables an organizer to create and manage reassembled content collections (e.g., topical channels of content units), similar to the manner in which the BlogBurst server enables organizers to create and manage working folders.

Figure 5L:
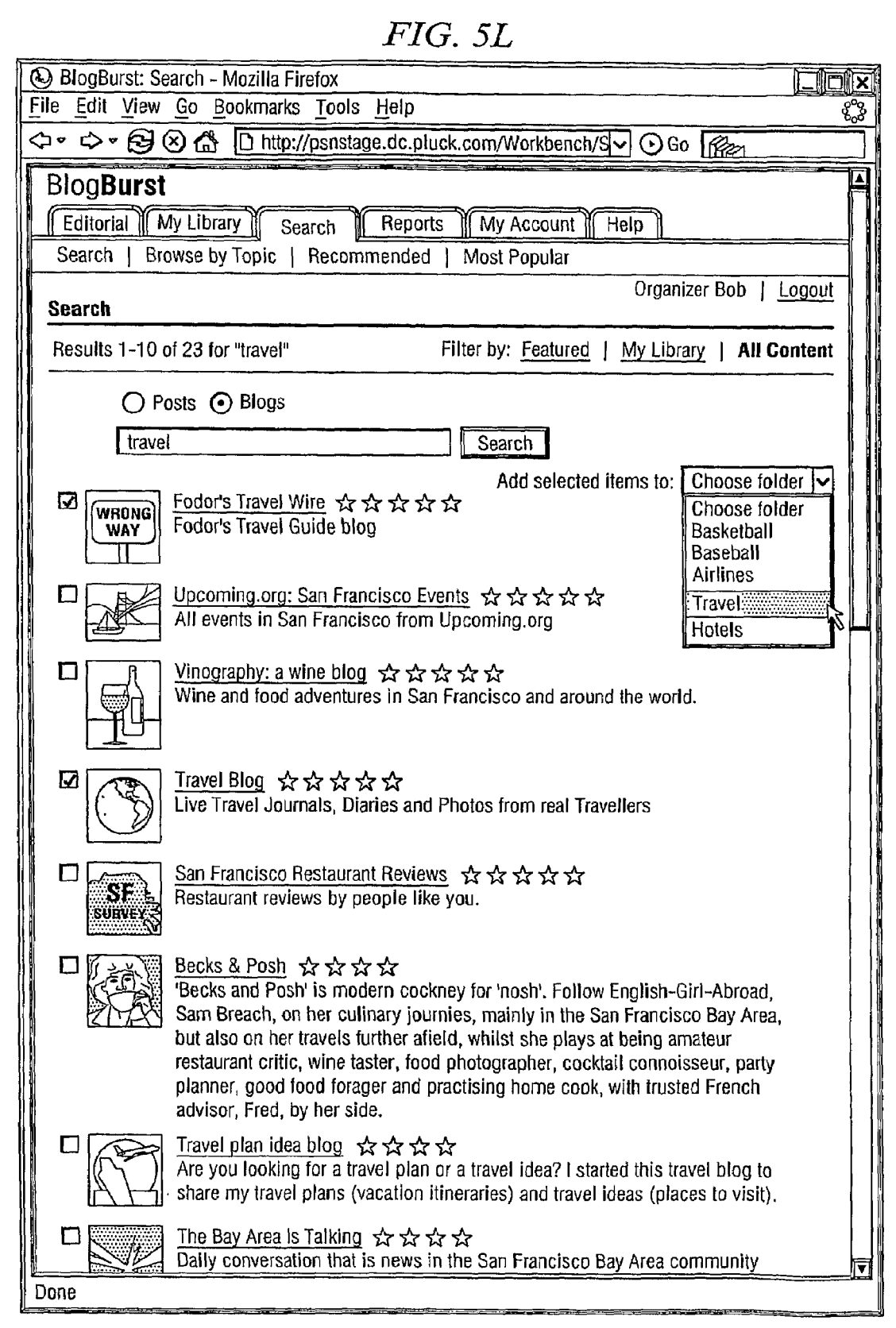

The BlogBurst server enables organizers to search content collections, organizer-assembled content collections and content units available in the BlogBurst server, similar to the manner discussed further hereinabove in connection with FIGS. 4G, 4I and 4N. For example, the BlogBurst server enables an organizer to: (a) search the BlogBurst server for content that matches one or more keywords (as shown in FIG. 5L); and (b) select any search result item (irrespective of whether a content collection, an organizer-assembled content collection, or a content unit) for addition to a working folder (as shown in FIGS. 5L and 5M, similar to the manner discussed further hereinabove in connection with FIGS. 4H and 4J) and/or for addition to a BurstWire (as shown in FIG. 5N). In response to such a selection of content for addition to a working folder and/or BurstWire, the BlogBurst server saves information for persistently associating such content with such working folder (as shown in FIG. 5M) and/or BurstWire (as shown in FIG. 5N). Also, FIG. 5M shows a facsimile of the working folder's BlogBurst content in reverse chronological order. Likewise, FIG. 5N shows a facsimile of the BurstWire's BlogBurst content in reverse chronological order.

Accordingly, from respective web sites of multiple contributors, via the network 120: the BlogBurst server receives and stores content, automatically and repeatedly, so that the stored content contemporaneously includes updates thereof from the web sites of the contributors. The receiving and storing of the content occurs under first license agreements that permit redistribution of the content. From a distributor, via the network 120: the BlogBurst server receives and stores a specification of a portion of the content and of a manner in which the portion is to be displayed in a web site of the distributor. To the web site of the distributor, via the network 120: the BlogBurst server outputs the portion of the content in accordance with the specification, automatically and repeatedly, so that the output portion of the content contemporaneously includes updates thereof from the web sites of the contributors. The outputting of the portion of the content occurs under a second license agreement that governs redistribution of the content.

In the method, system, and computer program product of the illustrative embodiments, various features are achieved, including the following.

1. An automated content licensing mechanism, controlled by the BlogBurst server, which obtains a license for displaying a contributor's content via a distributor's web site(s), so that the Blog Burst server operates as an agent for distributing the contributor's content and as an information service provider for the distributor.
2. A set of end user license agreements, administered by the BlogBurst server, which specify various rights to copy, distribute, publish, and perform other activities with a contributor's content, with click-through steps to verify online acceptance of such terms and conditions.
3. A content formatting and syndicating system (e.g., BlogBurst server) for substantially real-time distribution (to a distributor's web site(s)) of filtered content through selection, approval (e.g., automated approval), rating, and selective exclusion or inclusion (e.g., application logic instances) of content, including automated display of such content in compliance with the distributor's specified preferences (e.g., budgetary preferences).
4. A system (e.g., BlogBurst server) that provides a syndicated content marketplace for serving contributors and distributors, with interfaces for organizers and distributors to classify, add metadata to, price, classify, and editorialize such content.
5. A system (e.g., BlogBurst server) that provides automatic matchmaking between contributors and distributors by operating as a content management system, in response to (a) the system's internal criteria (e.g., metadata), (b) external requests from the system's users, and (c) measurements of quality that are derived from analysis of resources and their popularity among the system's users.
6. An interface, implemented by the BlogBurst server, for helping organizers to manage the process of selectively inviting contributors, and the process of categorizing, classifying, and controlling quality of content that is submitted by contributors.
7. An interface, implemented by the BlogBurst server, for helping a distributor to specify styles and formatting in extensible markup language ("XML") and hypertext markup language ("HTML") for automatic rendering in displays of content from contributors, in order to conform with the distributor's own web site style and formatting rules.
8. A system (e.g., BlogBurst server) that feeds content from working folders through channels that are dynamically rendered for display on a distributor's web site, in accordance with license agreements.

Referring again to FIG. 2, in one embodiment, the computer-readable medium 212 is a CD-ROM (compact disc, read-only memory). The computer-readable medium 212 and the computer 204 are structurally and functionally interrelated with one another as described further hereinbelow. Each computing device of the illustrative embodiment is structurally and functionally interrelated with a respective computer-readable medium, similar to the manner in which the computer 204 is structurally and functionally interrelated with the computer-readable medium 212. In that regard, the computer-readable medium 212 is a representative one of such computer-readable media, including for example but not limited to the storage device 211.

The computer-readable medium 212 stores (or encodes, or records, or embodies) functional descriptive material (e.g., including but not limited to software (also referred to as computer programs or applications) and data structures). Such functional descriptive material imparts functionality when encoded on the computer-readable medium 212. Also, such functional descriptive material is structurally and functionally interrelated to the computer-readable medium 212.

Within such functional descriptive material, data structures define structural and functional interrelationships between such data structures and the computer-readable medium 212 (and other aspects of the computer 204, the IHS 200 and the system 100). Such interrelationships permit the data structures' functionality to be realized. Also, within such functional descriptive material, computer programs define structural and functional interrelationships between such computer programs and the computer-readable medium 212 (and other aspects of the computer 204, the IHS 200 and the system 100). Such interrelationships permit the computer programs' functionality to be realized.

For example, the computer 204 reads (or accesses, or copies) such functional descriptive material from the computer-readable medium 212 into the memory device of the computer 204, and the computer 204 performs its operations (as described elsewhere herein) in response to such material which is stored in the memory device of the computer 204. More particularly, the computer 204 performs the operation of processing a computer application (that is stored, encoded, recorded or embodied on a computer-readable medium) for causing the computer 204 to perform additional operations (as described elsewhere herein). Accordingly, such functional descriptive material exhibits a functional interrelationship with the way in which the computer 204 executes its processes and performs its operations.

Further, the computer-readable medium is an apparatus from which the computer application is accessible by the computer 204, and the computer application is processable by the computer 204 for causing the computer 204 to perform such additional operations. In addition to reading such functional descriptive material from the computer-readable medium 212, the computer 204 is capable of reading such functional descriptive material from (or through) the network 112, which is also a computer-readable medium (or apparatus). Moreover, the memory device of the computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by at least one information handling system, the method comprising:
   repeatedly receiving content, the content received via a computer network from respective web sites of multiple contributors, so that the content includes updates from the web sites;
   outputting, via the computer network to one or more of the web sites, a preview of the content;
   receiving, via the computer network from the one or more of the web sites, validation of the preview;
   receiving, via the computer network from the one or more of the web sites, at least one of an annotation and a description of the content;
   outputting, via the computer network to a distributor system, the distributor system separate from the information handling system, at least one of the annotation and the description of the content;
   receiving, via the computer network from the distributor system, a specification of a portion of the content and of a manner in which the portion is to be displayed on a web site of the distributor system;
   selectively including or excluding the content resulting, in accordance with the specification, in the portion of the content; and
   repeatedly outputting, via the computer network to the distributor system, the portion of the content, so that the output includes updates from the web sites of the contributors.

2. The method of claim 1, wherein at least one of the web sites of the multiple contributors is publicly accessible.

3. The method of claim 1, wherein the contributors include bloggers, and wherein the content includes blogs of the contributors.

4. The method of claim 1, wherein the web site of the distributor system is a news web site.

5. The method of claim 1, wherein receiving the content comprises receiving the content as a syndication feed.

6. The method of claim 1, further comprising:
   from a distributor, via the computer network, receiving a command for a search of the content;
   performing the search in accordance with the command; and
   to the distributor system, via the computer network, outputting results of the search.

7. The method of claim 6, wherein the receiving the specification comprises receiving a selection, by the distributor, of at least one of the results of the search.

8. The method of claim 1, wherein the specification specifies a manner in which the portion is to be formatted for display on the web site of the distributor system.

9. The method of claim 1, wherein the specification specifies a manner in which the portion is to be sequenced for display on the web site of the distributor system.

10. The method of claim 1, wherein the specification specifies a location at which the portion is to be displayed on the web site of the distributor system.

11. The method of claim 1, wherein the specification specifies an amount of the portion to be displayed on the web site of the distributor system.

12. The method of claim 11, wherein the amount includes headlines of the portion.

13. The method of claim 11, wherein the amount includes all of the portion.

14. The method of claim 1, further comprising:
   automatically revising the portion of the content to enhance efficiency of the outputting of the portion of the content.

15. The method of claim 1, further comprising:
   blocking some of the portion of the content to enhance efficiency of the outputting of the portion of the content.

16. The method of claim 1, further comprising:
   outputting, via the computer network to the one or more of the web sites, a summary page.

17. A system, comprising:
   at least one memory for storing content received from respective web sites of multiple contributors, and further for storing a specification, received from a distributor, of a portion of the content and of a manner in which the portion is to be displayed on a web site of a distributor system; and
   at least one information handling system, coupled to the at least one memory, and configured to implement a method comprising:
   repeatedly receiving the content, the content received via a computer network, so that the content includes updates from the web sites;
   outputting to one or more of the web sites a preview of the content;
   receiving validation of the preview from the one or more of the web sites;
   outputting to the one or more of the web sites a summary page;
   receiving, from the one or more of the web sites, at least one of an annotation and a description of the content;
   outputting, to the web site of the distributor system, at least one of the annotation and the description of the content;
   receiving, from the distributor, a specification of a portion of the content and of a manner in which the portion is to be displayed on the web site of the distributor system;
   selectively including or excluding the content resulting, in accordance with the specification, in the portion of the content; and
   repeatedly outputting, to the web site of the distributor system, the portion of the content, so that the output includes updates from the web sites of the contributors.

18. The system of claim 17, wherein at least one of the web sites of the multiple contributors is publicly accessible.

19. The system of claim 17, wherein the contributors include bloggers, and wherein the content includes blogs of the contributors.

20. The system of claim 17, wherein the web site of the distributor system is a news web site.

21. The system of claim 17, wherein receiving the content comprises receiving the content as a syndication feed.

22. The system of claim 17, wherein the at least one information handling system is further configured to:
- from the distributor, via the computer network, receive a command for a search of the content;
- perform the search of the content in accordance with the command; and
- to the distributor, via the computer network, output results of the search of the content.

23. The system of claim 22, wherein receiving the specification comprises receiving a selection, by the distributor, of at least one of the results of the search of the content.

24. The system of claim 17, wherein the specification specifies a manner in which the portion is to be formatted for display on the web site of the distributor system.

25. The system of claim 17, wherein the specification specifies a manner in which the portion is to be sequenced for display on the web site of the distributor system.

26. The system of claim 17, wherein the specification specifies a location at which the portion is to be displayed on the web site of the distributor system.

27. The system of claim 17, wherein the specification specifies an amount of the portion to be displayed on the web site of the distributor system.

28. The system of claim 27, wherein the amount includes headlines of the portion.

29. The system of claim 27, wherein the amount includes all of the portion.

30. The system of claim 17, wherein the at least one information handling system is further configured to:
- automatically revise the portion of the content to enhance efficiency of the outputting of the portion of the content.

31. The system of claim 17, wherein the at least one information handling system is further configured to:
- automatically block some of all of the portion of the content to enhance efficiency of the outputting of the portion of the content.

32. A non-transitory computer-readable storage medium storing thereon computer readable instructions, the instructions to cause at least one information handling system to:
- repeatedly receive content, the content received from respective web sites of multiple contributors, so that the content includes updates from the web sites;
- output to one or more of the web sites a preview of the content;
- receive validation of the preview from the one or more of the web sites;
- output to the one or more of the web sites a summary page;
- receive from the one or more of the web sites, at least one of an annotation and a description of the content;
- output to a distributor system, at least one of the annotation and the description of the content;
- receive from the distributor system, a specification of a portion of the content and of a manner in which the portion is to be displayed on a web site of the distributor system;
- selectively include or exclude the content resulting, in accordance with the specification, in the portion of the content; and
- repeatedly output to the web site of the distributor system, the portion of the content, so that the output includes updates from the web sites of the contributors.

33. The computer-readable storage medium of claim 32, wherein at least one of the web sites of the multiple contributors is publicly accessible.

34. The computer-readable storage medium of claim 32, wherein the contributors include bloggers, and wherein the content includes blogs of the contributors.

35. The computer-readable storage medium of claim 32, wherein the web site of the distributor system is a news web site.

36. The computer-readable storage medium of claim 32, wherein receiving the content comprises receiving the content as a syndication feed.

37. The computer-readable storage medium of claim 32, wherein the instructions are executable by the at least one information handling system to further cause the at least one information handling system to:
- from a distributor, via the computer network, receive a command for a search of the content;
- perform the search of the content in accordance with the command; and
- to the distributor, via the computer network, output results of the search of the content.

38. The computer-readable storage medium of claim 37, wherein receiving the specification comprises receiving a selection, by the distributor, of at least one of the results of the search of the content.

39. The computer-readable storage medium of claim 32, wherein the specification specifies a manner in which the portion is to be formatted for display on the web site of the distributor system.

40. The computer-readable storage medium of claim 32, wherein the specification specifies a manner in which the portion is to be sequenced for display on the web site of the distributor system.

41. The computer-readable storage medium of claim 32, wherein the specification specifies a location at which the portion is to be displayed on the web site of the distributor system.

42. The computer-readable storage medium of claim 32, wherein the specification specifies an amount of the portion to be displayed on the web site of the distributor system.

43. The computer-readable storage medium of claim 42, wherein the amount includes headlines of the portion.

44. The computer-readable storage medium of claim 42, wherein the amount includes all of the portion.

45. The computer-readable storage medium of claim 32, wherein the instructions are executable by the at least one information handling system to further cause the at least one information handling system to:
- automatically revise the portion of the content to enhance efficiency of the outputting of the portion of the content.

46. The computer-readable storage medium of claim 32, wherein the instructions are executable by the at least one information handling system to further cause the at least one information handling system to:
- automatically block some of the portion of the content to enhance efficiency of the outputting of the portion of the content.

* * * * *